United States Patent
Isono et al.

(10) Patent No.: US 6,276,763 B1
(45) Date of Patent: Aug. 21, 2001

(54) METHOD OF DIAGNOSING BRAKE BOOSTER BASED ON ITS INPUT AND OUTPUT, AND BRAKING SYSTEM INCLUDING DIAGNOSING DEVICE CAPABLE OF PRACTICING THE METHOD

(75) Inventors: Hiroshi Isono, Susono; Motoshi Suzuki, Nagoya; Hirofumi Nitta, Kariya, all of (JP)

(73) Assignees: Toyota Jidosha Kabushiki Kaisha, Toyota; Aisin Seiki Kabushiki Kaisha, Kariya, both of (JP)

(*) Notice: Subject to any disclaimer, the term of this patent is extended or adjusted under 35 U.S.C. 154(b) by 0 days.

(21) Appl. No.: 09/248,854

(22) Filed: Feb. 11, 1999

(30) Foreign Application Priority Data

Feb. 17, 1998 (JP) .................................. 10-035033

(51) Int. Cl.⁷ ........................................ B60T 8/32
(52) U.S. Cl. .................... 303/114.1; 303/113.4; 188/358
(58) Field of Search .................. 303/12, 113.1, 303/113.3, 113.4, 114.1, 114.3; 60/545; 701/71, 76; 188/353, 355, 356, 357, 358, 359

(56) References Cited

U.S. PATENT DOCUMENTS

| | | | |
|---|---|---|---|
| 5,261,730 | * 11/1993 | Steiner et al. | 303/113.4 |
| 5,709,438 | 1/1998 | Isakson et al. | 303/113.4 |
| 5,967,628 | * 10/1999 | Abe et al. | 303/122.12 |
| 5,991,681 | * 11/1999 | Bill et al. | 701/70 |
| 6,019,438 | * 2/2000 | Sawada et al. | 303/113.4 |
| 6,033,037 | * 3/2000 | Eckert | 303/114.3 |

FOREIGN PATENT DOCUMENTS

| | | |
|---|---|---|
| 40 02 865 A1 | 2/1990 | (DE). |
| 0 485 367 A2 | 6/1989 | (EP). |
| 0 754 607 A2 | 1/1997 | (EP). |
| 0 800 975 A2 | 10/1997 | (EP). |
| 0 850 815 A1 | 12/1997 | (EP). |
| 0 827 887 A2 | 3/1998 | (EP). |
| 2 128 279A | 4/1984 | (GB). |
| 2 297 134A | 7/1996 | (GB). |
| 2 318 844A | 5/1998 | (GB). |
| 456669A | 2/1992 | (JP). |
| WO 99/38741 | 8/1999 | (WO). |

* cited by examiner

*Primary Examiner*—Christopher P. Schwartz
(74) *Attorney, Agent, or Firm*—Kenyon & Kenyon

(57) ABSTRACT

Method of diagnosing a booster of a braking system including a brake operating member operated with a brake operating force, a master cylinder for producing a hydraulic pressure on the basis of an input force received from the booster as a result of boosting of the brake operating force by said booster, and a wheel brake cylinder which is activated by the hydraulic pressure produced by the master cylinder, to brake a vehicle wheel, wherein the booster is determined to be abnormal if the detected input and output of the booster do not meet a predetermined nominal relationship therebetween. Also disclosed is a diagnosing device capable of practicing the method.

37 Claims, 10 Drawing Sheets

METHOD OF DIAGNOSING BRAKE BOOSTER BASED ON ITS INPUT AND OUTPUT, AND BRAKING SYSTEM INCLUDING DIAGNOSING DEVICE CAPABLE OF PRACTICING THE METHOD

This application is based on Japanese Patent Application No. 10-35033 filed Feb. 17, 1998, the content of which is incorporated hereinto by reference.

BACKGROUND OF THE INVENTION

1. Field of the Invention

The present invention relates to techniques for diagnosing a booster of a braking system for an automotive vehicle.

2. Discussion of the Related Art

JP-A-4-56669 discloses an example of a known technique for diagnosing a vacuum booster of a vehicle braking system, for any abnormality. This known diagnosing technique is based on a fact that the vacuum booster becomes inoperative to perform a normal boosting function when a negative pressure of a negative pressure source to which the vacuum booster is connected has been raised above a predetermined upper limit. According to the known diagnosing technique, a pressure switch is used to either mechanically or electrically detect that the negative pressure of the negative pressure source has exceeded the upper limit.

A study of the present inventors has revealed that when the vacuum booster is abnormal, the input and the output of the booster do not have a predetermined or known nominal relationship, and that this fact can be utilized to effect a diagnosis of the booster for any abnormality.

SUMMARY OF THE INVENTION

It is therefore a first object of the present invention to provide a method by which a brake booster can be diagnosed for any abnormality, based on the fact that the input and output of the booster do not have or meet a nominal relationship therebetween when the booster is abnormal.

It is a second object of this invention to provide a braking system capable of diagnosing its booster for any abnormality, based on the above fact.

The first object may be achieved according to any one of the following modes (1)–(5) of this invention, while the second object may be achieved according to any one of the following modes (6)–(33). Each of these modes of the invention is numbered like the appended claims, and depends from the other mode or modes, where appropriate, so as to indicate possible combinations of elements or features in preferred forms of the present invention:

(1) A method of diagnosing a booster of a braking system for an automotive vehicle, the braking system including a brake operating member operated with a brake operating force, a master cylinder for producing a hydraulic pressure on the basis of an input force received from the booster as a result of boosting of the brake operating force by the booster, and a wheel brake cylinder which is activated by the hydraulic pressure produced by the master cylinder, to brake a wheel of the automotive vehicle, the method comprising the steps of: (a) detecting an input and an output of the booster; and (b) determining that the booster is abnormal, if the detected input and output do not meet a predetermined nominal relationship therebetween.

The present method permits highly reliable diagnosis of the booster for any abnormality thereof on the basis of the relationship of the detected input and output of the booster, regardless of a cause for the abnormality.

The booster to be diagnosed by the present method may be not only a vacuum booster activated by a negative air pressure source, but also a hydraulic booster activated by a hydraulic pressure source, more specifically, a high-pressure source whose pressure is higher than the atmospheric pressure. Generally, the vacuum booster has a negative-pressure chamber connected to a negative pressure source, and a variable-pressure chamber which is selectively communicated with the negative-pressure chamber and the atmosphere, and includes a power piston which is operated on the basis of a pressure difference of the negative-pressure and variable-pressure chambers, so as to boost a brake operating force which acts on a brake operating member of the braking system. On the other hand, the hydraulic booster is generally adapted such that a power piston is operated to boost the brake operating force, on the basis of the pressure in a power chamber which is selectively communicated with the high-pressure source and a low-pressure source.

The input of the booster may be selected from among various parameters, such as the brake operating force acting on the brake operating member, an axial force acting on the input rod of the vacuum or hydraulic booster, the pressure in the variable-pressure chamber of the vacuum booster, and a pressure in the power chamber of the hydraulic booster. The brake operating force acting on the brake operating member may be detected either directly, or indirectly on the basis of the operating stroke of the brake operating member. Similarly, the axial force acting on the input rod of the booster may be detected either directly, or indirectly on the basis of the operating stroke of the input rod.

The output of the booster may be selected from among various parameters, such as an axial force acting on the power piston or output rod of the booster, an axial force acting on the pressurizing piston of the master cylinder, a pressure in a pressurizing chamber of the master cylinder, a pressure in a fluid passage connected to the pressurizing chamber, a pressure in the wheel brake cylinder, and a deceleration value of the automotive vehicle braked by braking of the wheel by the wheel brake cylinder.

(2) A method according to the above mode (1), wherein the input and the output of the booster are substantially concurrently detected by respective sensors, and the booster is determined abnormal if the detected input and output do not meet the predetermined nominal relationship.

(3) A method according to the above mode (1), wherein one of the input and output of the booster is detected as a first physical quantity by a switch which generates two signals one of which indicates that the first physical quantity is smaller than a predetermined value and the other of which indicates that the first physical quantity is not smaller than the predetermined value, the other of the input and output being substantially continuously detected as a second physical quantity by a sensor when the first physical quantity has become equal to the predetermined value, and wherein the booster is determined to be abnormal, if the second physical quantity detected by the sensor deviates from a nominal value thereof corresponding to the predetermined value of the first physical quantity.

Generally, a switch for digitally detecting that a certain physical quantity has become equal to a predetermined value has a higher degree of operating reliability and is simpler in construction and available at a lower cost, than a sensor for substantially continuously detecting a certain, physical quantity. In this sense, the method according to the above mode (3) is more reliable than the method according to the above mode (2), and a diagnosing device adapted to practice the method according to the mode (3) is simpler in construction and easier to manufacture, than a diagnosing device adapted to practice the method according to the mode (2).

(4) A method according to the above mode (3), wherein the first physical quantity is the input of the booster while the second physical quantity is the output of the booster.

Some braking system employs a sensor for substantially continuously detecting the output of the booster, for a purpose other than a diagnosis of the booster. In this type of braking system, the sensor is preferably used for diagnosing the booster. It is also noted that where the sensor for detecting one of the input and output of the booster is available, the use of another sensor for detecting the other of the input and output is not essential for diagnosing the booster, that is, the use of a switch for detecting a threshold value of this input or output is sufficient for diagnosing the booster. The use of the sensor and the switch indicated above makes it possible to reduce an increase in the constructional complexity and cost of manufacture of the braking system, which increase arises from the provision of the diagnosing device for effecting the diagnosis of the booster for the automotive vehicle. The method according to the above mode (4) is based on the above finding.

(5) A method according to the above mode (4), wherein the predetermined value of the first physical quantity is determined to be a value of the brake operating force which is necessarily reached during a normal operation of the brake operating member.

In the method according to the above mode (5), the diagnosis of the booster can be conducted comparatively frequently, that is, each time the brake operating member is normally operated. This arrangement permits comparatively early detection of an abnormality of the booster.

For instance, the "value of the brake operating force which is necessarily reached during a normal operation of the brake operating member" may be selected within a range of 4–6 kgf, for example, selected to be 5 kgf.

(6) A braking system of an automotive vehicle including a brake operating member, a booster for boosting a brake operating force acting on the brake operating member, a master cylinder for producing a hydraulic pressure on the basis of an input force received from the booster as a result of boosting of the brake operating force by the booster, and a wheel brake cylinder which is activated by the hydraulic pressure produced by the master cylinder, to brake a wheel of the automatic vehicle, the braking system comprising a booster diagnosing device for detecting an input and an output of the booster, and determining that the booster is abnormal, if the detected input and output do not meet a predetermined nominal relationship therebetween.

Like the method of the invention, the diagnosing device of the braking system according to the invention permits reliable diagnosis of the booster.

The terms "booster", "input of the booster" and "output of the booster" are interpreted as described above with respect to the method according to the mode (1) of this invention.

(7) A braking system according to the above mode (6), wherein the booster diagnosing device includes (a) a switch for detecting one of the input and output of the booster as a first physical quantity, the switch generating two signals one of which indicates that the first physical quantity is smaller than a predetermined value and the other of which indicates that the first physical quantity is not smaller than the predetermined value, (b) a sensor for substantially continuously detecting the other of the input and output as a second physical quantity when the first physical quantity has become equal to the predetermined value, and (c) determining means for determining that the booster is abnormal, if the second physical quantity detected by the sensor deviates from a nominal value thereof corresponding to the predetermined value of said first physical quantity.

The booster diagnosing device of the present braking system has substantially the same advantages as the method according to the above mode (3), that is, improved operating reliability, simplified construction and reduced cost of manufacture.

(8) A braking system according to the above mode (7), wherein the first physical quantity is said input while the second physical quantity is said output.

The booster diagnosing device of the braking system according to the above mode (8) has substantially same advantages as the method according to the above mode (4), that is, reduced increase in the constructional complexity and the cost of manufacture of the device.

(9) A braking system according to the above mode (7) or (8), wherein said switch includes a switch for detecting a predetermined value of said brake operating force.

(10) A braking system according to the above mode (6), wherein the booster includes an input rod which receives the brake operating force, the braking system further comprising:

a connecting member connecting the brake operating member and the input rod to each other, so as to permit a relative movement between the brake operating member and the input rod in an axial direction of the input rod by a predetermined maximum distance;

a pivotal member connected to the brake operating member such that the pivotal member is pivotable about an axis perpendicular to the axial direction of the input rod, on the basis of the relative movement between the brake operating member and the input rod; and an elastic member for biasing the brake operating member and the input rod away from each other in the axial direction, and wherein the booster diagnosing device includes a signal generating device fixed to one of the brake operating member and the pivotal member, such that the signal generating device is operated in response to a relative movement between the brake operating member and the pivotal member caused by the relative movement between the brake operating member and the input rod, the signal generating device generating an output signal relating to the brake operating force as the input of the booster, depending upon a distance of said relative movement between the brake operating member and the input rod.

In the braking system according to the above mode (10), the relative movement of the brake operating member and the input rod is indirectly utilized by the signal generating device. That is, the relative movement of the brake operating member and the input rod is converted into a pivotal movement of the pivotal member relative to the brake operating member, so that the output signal generated by the signal generating device changes depending upon the distance of the relative movement between the brake operating member and the pivotal member, that is, depending upon the distance of the relative movement between the brake operating member and the input rod. This arrangement permits easier designing of the relationship between the operating strokes of the brake operating member and the signal generating device, or the relationship between the brake operating force acting on the brake operating member and the operating force of the signal generating device or the biasing force of the elastic member.

The elastic member may be interposed either between the brake operating member and the input rod so as to bias directly these two members, or between the brake operating member and the pivotal member which is pivoted with an axial movement of the input rod, so that the input rod is biased by the biasing member indirectly via the pivotal member.

The braking system may have the feature according to the above mode (10), without the feature of the booster diagnosing device according to the above mode (6), namely, with a booster diagnosing device having the signal generating device to diagnose the booster for abnormality, without relying upon the nominal relationship between the input and output of the booster.

(11) A braking system according to the above mode (10), wherein the pivotal member includes a lever which is pivoted as the brake operating member and the input rod are moved relative to each other, such that the relative movement between the brake operating member and the input rod is magnified into the relative movement between a portion of the one of the brake operating member and the pivotal member at which the signal generating device is fixed, and a corresponding portion of the other of the brake operating member and the pivotal member.

In the braking system according to the above mode (11), the relative movement of the brake operating member and the input rod is magnified into the relative movement of the corresponding portions of the brake operating member and the pivotal member, so that the signal generating device is operated in response to the magnified relative movement. This arrangement makes it possible to reduce the operating stroke of the brake operating member which is required to change the operating state of the signal generating device. The present arrangement permits the signal generating device to function without causing a substantive change in the operating feel of the brake operating member as given to the vehicle operator.

(12) A braking system according to the above mode (7), wherein the booster includes an input rod which receives the brake operating force, the braking system further comprising:

a connecting member connecting the brake operating member and the input rod;

at least one of (a) a first connector connecting two separate axial portions of the connecting member, so as to permit a relative movement between the two separate axial portions by a predetermined maximum distance in an axial direction of the input rod, (b) a second connector connecting two separate axial portions of the input rod, so as to permit a relative movement between the two separate axial portions of the input rod by a predetermined maximum distance in the axial direction, (c) a third connector connecting the brake operating member and the connecting member as two separate axial portions, so as to permit a relative movement between the brake operating member and the connecting member by a predetermined maximum distance in the axial direction, and (d) a fourth connector connecting the connecting member and the input rod as two separate axial portions, so as to permit a relative movement between the connecting member and the input rod by a predetermined maximum distance in the axial direction; and an elastic member for biasing the two separate axial portions away from each other in the axial direction, the elastic member having a set load corresponding to the predetermined value of the first physical quantity, and wherein the switch includes a brake operating force switch for detecting whether the brake operating force as the first physical quantity is smaller than the predetermined value, the brake operating force switch generating a first output signal indicating that the brake operating force is smaller than the predetermined value, when a distance between the two separate axial portions is the smallest, and a second output signal indicating that the brake operating force is not smaller than the predetermined value, when the distance is the largest.

In the braking system according to the above mode (12), the brake operating force is transmitted from the brake operating member to the input rod through at least one of the four connectors each of which permits a relative movement of two separate axial portions in the axial direction of the input rod. The relative movement of the two separate axial portions permitted by each of the above-indicated at least one connector is utilized by the brake operating force switch to detect whether the brake operating force is smaller than the predetermined value.

The braking system may have the feature according to the above mode (12), without the feature of the booster diagnosing device according to the above mode (6), namely, with a booster diagnosing device having the brake operating force switch to diagnose the booster for abnormality, without relying upon the nominal relationship between the input and output of the booster.

(13) A braking system according to the above mode (12), wherein the connecting member includes a first engaging portion engaging the brake operating member and a second engaging portion engaging the input rod.

(14) A braking system according to the above mode (13), wherein the first engaging portion engages the brake operating member so as to substantially inhibit the relative movement between the connecting member and the brake operating member in the axial direction, while the second engaging portion engages the input rod so as to permit the relative movement between the connecting member and the input rod in the axial direction, the braking system comprising the fourth connector, the fourth connector including the second engaging portion.

(15) A braking system according to the above mode (13), wherein the first engaging portion engages the brake operating member so as to permit the relative movement between the connecting member and the brake operating member in the axial direction, while the second engaging portion engages the input rod so as to substantially inhibit the relative movement between the connecting member and the input rod in the axial direction, the braking system comprising the third connector, the third connector including the first engaging portion.

(16) A braking system according to the above mode (13), wherein the first engaging portion engages the brake operating member so as to substantially inhibit the relative movement between the connecting member and the brake operating member in the axial direction, and the second engaging portion engages the input rod so as to substantially inhibit the relative movement between the connecting member and the input rod in the axial direction, the braking system comprising the second connector connecting the two separate axial portions of the input rod.

(17) A braking system according to the above mode (13), wherein the first engaging portion engages the brake operating member so as to substantially inhibit the relative movement between the connecting member and the brake operating member in the axial direction, and the second engaging portion engages the input rod so as to substantially inhibit the relative movement between the connecting member and the input rod in the axial direction, the braking system comprising the first connector connecting the two separate axial portion of the connecting member.

(18) A braking system according to the above mode (7), wherein the booster includes an input rod receiving the brake operating force, the braking system further comprising:

a connecting member connecting the brake operating member and the input rod, so as to permit a relative movement between the brake operating member and the input rod in an axial direction of the input rod by a predetermined maximum distance;

a pivotal member connected to the brake operating member such that the pivotal member is pivotable about an axis perpendicular to the axial direction of the input rod, on the basis of the relative movement between the brake operating member and the input rod; and an elastic member for biasing the brake operating member and the input rod away from each other in the axial direction, the elastic member having a set load corresponding to the predetermined value of the first physical quantity, and wherein the switch includes a brake operating force switch fixed to one of the brake operating member and the pivotal member, such that the brake operating force switch is operated in response to a relative movement between a portion of the one of the brake operating member and the pivotal member at which the brake operating force switch is fixed, and a corresponding portion of the pivotal the other of the above-indicated one of the brake operating member and the member, the brake operating force switch generating a first output signal indicating that the brake operating force is smaller than the predetermined value, when a distance between the brake operating member and the input rod is the smallest, and a second output signal indicating that the brake operating force is not smaller than the predetermined value, when the distance is the largest.

In the braking system according to the above mode (18), the relative movement of the brake operating member and the input rod is indirectly utilized by the brake operating force switch. That is, the relative movement of the brake operating member and the input rod is converted into a pivotal movement of the pivotal member relative to the brake operating member, so that the output signal generated by the brake operating force switch changes depending upon whether the distance of the relative movement between the brake operating member and the pivotal member exceeds a predetermined threshold, that is, depending upon whether the distance of the relative movement between the brake operating member and the input rod exceeds the predetermined threshold. This arrangement permits easier designing of the relationship between the operating strokes of the brake operating member and the brake operating force switch, or the relationship between the brake operating force acting on the brake operating member and the operating force of the brake operating force switch or the biasing force of the elastic member.

The elastic member may be interposed either between the brake operating member and the input rod so as to bias directly these two member, or between the brake operating member and the pivotal member which is pivoted with an axial movement of the input rod, so that the input rod is biased by the biasing member indirectly via the pivotal member.

The braking system may have the feature according to the above mode (18), without the feature of the booster diagnosing device according to the above mode (6), namely, with a booster diagnosing device having the brake operating force switch to diagnose the booster for abnormality, without relying upon the nominal relationship between the input and output of the booster.

(19) A braking system according to the above mode (18), wherein the pivotal member includes a lever which is pivoted as the brake operating member and the input rod are moved relative to each other, such that the relative movement between the brake operating member and the input rod is magnified into the relative movement between the portion of the braking operating member and the corresponding portion of the pivotal member.

In the braking system according to the above mode (19), the relative movement of the brake operating member and the input rod is magnified into the relative movement of the corresponding portions of the brake operating member and the pivotal member, so that the brake operating force switch is operated in response to the magnified relative movement. This arrangement makes it possible to reduce the operating stroke of the brake operating member which is required to change the operating state of the brake operating force switch. The present arrangement permits the brake operating force switch to function without causing a substantive change in the operating feel of the brake operating member as given to the vehicle operator.

(20) A braking system according to the above mode (18) or (19), wherein the connecting member includes a first engaging portion engaging the brake operating member and a second engaging portion engaging the input rod, the first engaging portion including a pin which is fixedly disposed on the connecting member and which engages an elongate hole formed through the brake operating member, so as to permit a relative movement between the brake operating member and the connecting member in the axial direction of the input rod by a predetermined maximum distance, the second engaging portion engaging the input rod so as to substantially inhibit a relative movement between the connecting member and the input rod in the axial direction, the pivotal member engaging the brake operating member and the first engaging portion such that the pivotal member is pivotable relative to the brake operating member, about a pivot axis which is spaced from an axis of the input rod in a direction perpendicular to the axial direction, and such that the pivotal member is pivotable relative to the connecting member about an axis of the pin while a relative movement between the pivotal member and the connecting member in the axial direction is substantially inhibited.

The braking system according to the above mode (20) may be modified such that the elongate hole is replaced by a hole having a diameter larger than that of the pin.

(21) A braking system according to the above mode (20), wherein a distance between the pivot axis of the pivotal member and a point of contact of the pivotal member with the brake operating force switch is larger than a distance between the pivot axis and the axis of the pin.

(22) A braking system according to the above mode (20) or (21), wherein the pivotal member is attached to the brake operating member so as not to unnecessarily move relative to the brake operating member, even where the pin of the connecting member is not installed so as to connect the pivotal member and the brake operating member.

(23) A braking system according to any one of the above modes (7)–(9) and (12)–(22), wherein the sensor includes a sensor for detecting the hydraulic pressure produced by the master cylinder.

(24) A braking system according to any one of the above modes (6)–(23), further comprising:
a hydraulic pressure source other than the master cylinder; and
a pressure increasing device for performing a pressure increasing operation to increase a hydraulic pressure in the wheel brake cylinder, by using the hydraulic pressure source, such that the hydraulic pressure in the wheel brake cylinder is higher than the hydraulic pressure produced by the master cylinder, the pressure increasing device performing the pressure increasing operation when a predetermined condition is satisfied.

(25) A braking system according to the above mode (24), further comprising a master-cylinder-pressure-related sensor for detecting, as the output of the booster, a quantity relating to the hydraulic pressure produced by the master cylinder, and where the pressure increasing device determines, on the basis of the quantity detected by the master-cylinder-pressure-related sensor, at least one of a moment at which the pressure increasing operation is initiated and an amount of increase of the hydraulic pressure in the wheel brake cylinder.

In the braking system according to the above mode (25), the master-cylinder-pressure-related sensor can be used for two purposes, that is, for diagnosing the booster and for increasing the pressure in the wheel brake cylinder. Thus, only one sensor is required for those two purposes, and the cost of manufacture of the braking system is accordingly reduced.

(26) A braking system according to the above mode (24) or (25), wherein the predetermined condition is satisfied when the booster diagnosing device determines that the booster is abnormal.

(27) A braking system according to the above mode (24) or (25), wherein the predetermined condition is satisfied when a boosting limit of the booster has been reached.

(28) A braking system according to the above mode (24) or (25), wherein the predetermined condition is satisfied when a determination by the booster diagnosing device that the booster is abnormal is present, or when a boosting limit of the booster has been reached while the determination by the booster diagnosing device is absent, the pressure increasing device determining an amount of increase of the hydraulic pressure in the wheel brake cylinder, to be larger when the determination is present than when the determination is absent.

(29) A braking system according to any one of the above modes (24)–(28), wherein the pressure increasing device includes a fluid passage connecting said master cylinder and the wheel brake cylinder, a fluid flow control valve provided in the fluid passage, and a pump as the hydraulic pressure source which is connected on a delivery side thereof to a portion of the fluid passage between the fluid flow control valve and the wheel brake cylinder, said pump being activated to deliver a pressurized working fluid to the wheel brake cylinder while a flow of the working fluid from the wheel brake cylinder toward the master cylinder is inhibited by the fluid flow control valve, so that the hydraulic pressure in the wheel brake cylinder is made higher than the hydraulic pressure in the master cylinder.

(30) A braking system according to the above mode (29), wherein the fluid flow control valve includes a solenoid-operated two-position valve having an open position and a closed position.

(31) A braking system according to the above mode (30), wherein the pressure increasing device further includes a pressure difference generator valve which by-passes the two-position valve, the pressure difference generator valve cooperating with the pump to increase the hydraulic pressure in the wheel brake cylinder such that the hydraulic pressure in the wheel brake cylinder is higher than the hydraulic pressure in the master cylinder by a predetermined fixed amount.

(32) A braking system according to the above mode (29), wherein the fluid flow control valve is a pressure control valve including (a) a valve member and a valve seat which are moved away from each other to permit a flow of the working fluid from the wheel brake cylinder toward the master cylinder, and are moved toward each other for fluid tight contact therebetween to inhibit the flow of the working fluid, and (b) a pressure difference control device for producing and controlling a magnetic force acting on at least one of the valve member and said valve seat in a direction for moving the valve member and the valve seat toward each other, so as to continuously control a difference between the hydraulic pressures in the wheel brake cylinder and the master cylinder, depending upon the magnetic force.

(33) A braking system according to the above mode (32), wherein the pressure difference control device includes a solenoid coil.

(34) A braking system for an automotive vehicle, comprising: a brake operating member; a booster for boosting a brake operating force acting on the brake operating member, the booster including an input rod which receives the brake operating force; a master cylinder for producing a hydraulic pressure on the basis of an input force recevied from the booster as a result of boosting of the brake operating force by the booster; a wheel brake cylinder which is activated by the hydraulic pressure produced by the master cylinder, to brake a wheel of the automatic vehicle; a connecting mechanism connecting the brake operating member and the input rod to each other, so as to permit a relative movement between the brake operating member and the input rod in an axial direction of the input rod by a predetermined distance; and a signal generating device generating an output signal relating to the brake operating force depending upon a distance of the relative movement.

In the braking system according to the above mode (34), the relative movement of the brake operating member and the input rod of the booster is directly or indirectly utilized by the signal generating device.

(35) A braking system according to the above mode (34), wherein the connecting mechanism includes (a) a connecting member connecting the brake operating member and the input rod to each other, so as to permit the relative movement between the brake operating member and the input rod in the axial direction of the input rod by the predetermined maximum distance; (b) a pivotal member connected to the brake operating member such that the pivotal movement is pivotal about an axis perpendicular to the axial direction of the input rod, on the basis of the relative movement between the brake operating member and the input rod; and (c) an elastic member for biasing the brake operating member and the input rod away from each other in the axial direction.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
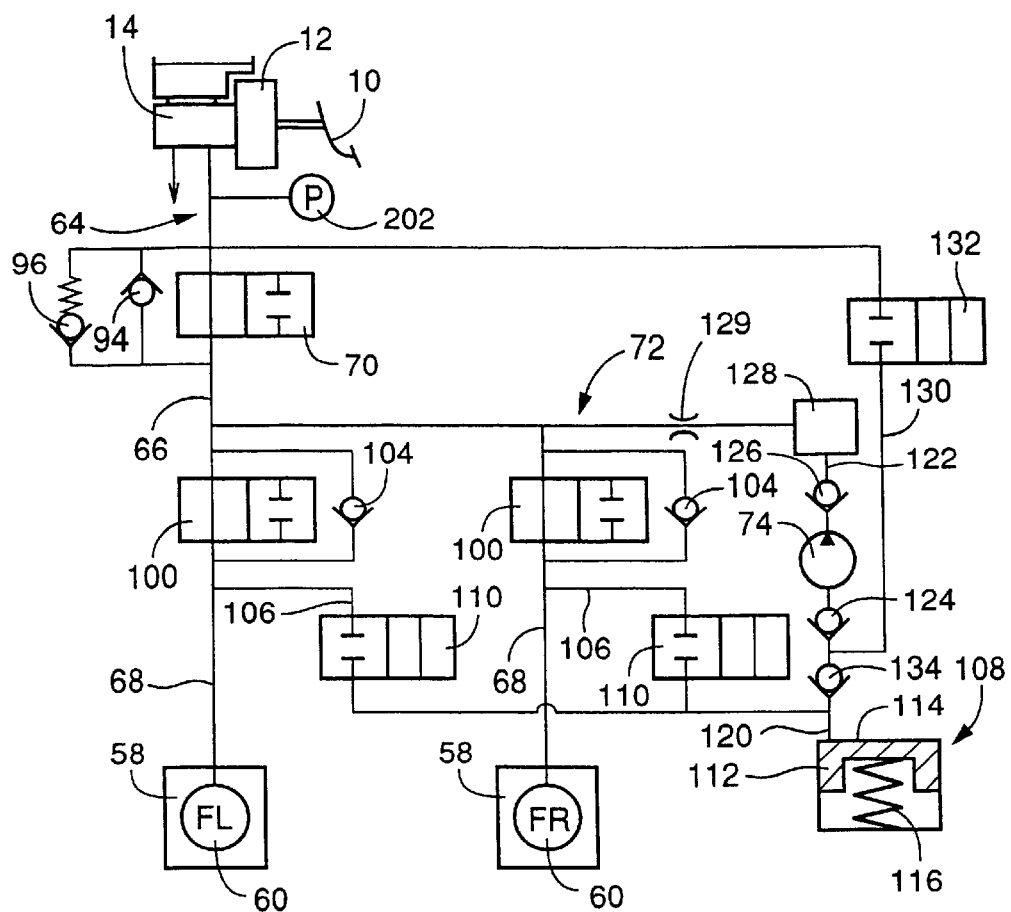
FIG. 1 is a schematic view showing a mechanical arrangement of a braking system constructed according to a first embodiment of this invention.

Referring first to FIG. 1, the braking system constructed according to a first embodiment of the present invention includes a brake operating member in the form of a brake pedal 10, and a vacuum booster 12 (hereinafter referred to simply as "booster 12") through which the brake pedal 10 is operatively connected to a master cylinder 14. The booster 12 has a negative-pressure chamber and a variable-pressure chamber. The negative-pressure chamber is connected to a negative air pressure source, which is a negative-pressure portion of an engine of an automotive vehicle. The variable-pressure chamber is selectively communicated with the negative-pressure chamber and the atmosphere. The booster 12 includes a power piston which is axially moved by a difference between the pressures in the negative-pressure and variable-pressure chambers. By a force of the power piston acting in the direction toward the master cylinder 14, a brake operating force $F_P$ acting on the brake pedal 10 is boosted by the booster 12. The boosted brake operating force is transmitted to the master cylinder 14. The master cylinder 14 is a tandem type hydraulic cylinder including a housing, and two pressurizing pistons which are slidably received in the housing, in series with each other. The pressurizing pistons cooperate with the housing to define two mutually independent pressurizing chambers in front of the respective pressurizing pistons. The master cylinder 14 is arranged to mechanically produce substantially equal hydraulic pressures in the two pressurizing chambers, depending upon the brake operating force $F_P$ acting on the brake pedal 10.

Figure 2:
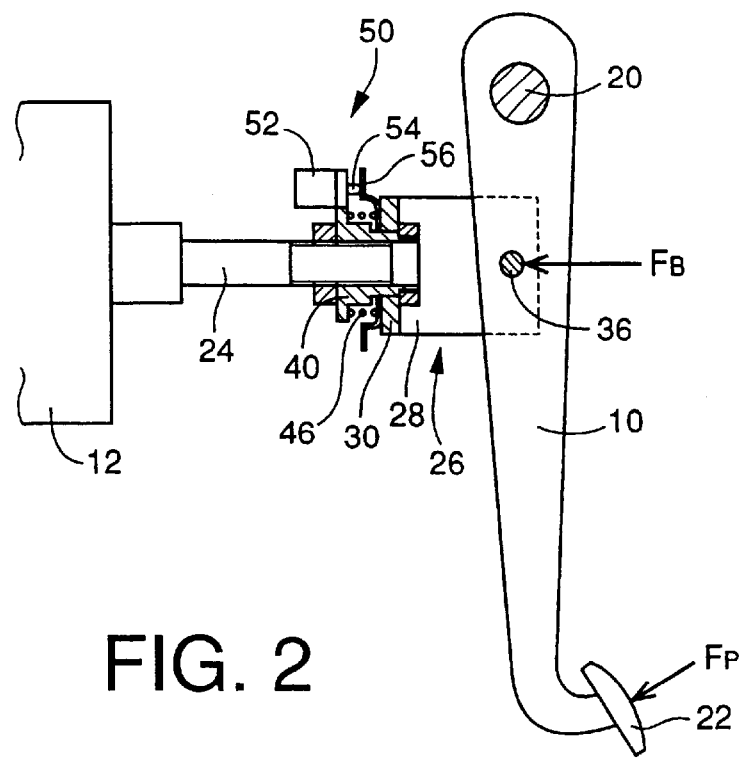
FIG. 2 is a fragmentary side elevational view in cross section showing in enlargement a brake pedal, an input rod of a booster, and a mechanism connecting the brake pedal and the input rod.

Referring next to FIG. 2, there are shown a structure for supporting the brake pedal 10, and a mechanism which operatively connects the brake pedal 10 and the booster 12 to each other.

The brake pedal 10 is connected at its fixed end portion thereof to the vehicle body via a pin 20, such that the brake pedal 10 is pivotable about the axis of the pin 20. The brake pedal 10 has a pedal pad 22 fixed at its free end, so that the brake operating force $F_P$ is applied to the pedal pad 22 when the brake pedal 10 is depressed at the pedal pad 22 by the vehicle operator.

The brake pedal 10 is connected at a longitudinally intermediate portion thereof to an input rod 24 of the booster 12. A booster input force $F_B$ which is transmitted from the brake pedal 10 to the input rod 24 of the booster 12 is represented by an equation, $F_B = F_P \times R_P$, wherein "$R_P$" represents the boosting ratio (lever ratio) of the brake pedal 10.

The input rod 24 projects from the housing of the booster 12 toward the brake pedal 10, and is connected, at its end portion remote from the housing, to the brake pedal 10 through a clevis 26. As shown in the enlarged plan view, the clevis 26 is a generally U-shaped structure consisting of a pair of side plates 28, 28 which are spaced apart from each other in a direction perpendicular to the axis of the input rod 24, and a base plate 30 connecting the two side plates 28, 28 at their corresponding ends. The two side plates 28, 28 have respective first pin holes 32, 32 which are concentric with each other in the above-indicated direction. On the other hand, the brake pedal 10 has a second pin hole 34 formed through its longitudinally intermediate portion. A pin 36 extends through the first pin holes 32, 32 and the second pin hole 34, whereby the clevis 26 is connected to the brake pedal 10 such that the clevis 26 and the brake pedal 10 are pivotable relative to each other about the axis of the pin 36. The first pin holes 32, 32 and the second pin hole 34 are all round holes having a diameter slightly larger than the diameter of the pin 36, so that a relative movement of the brake pedal 10 and the clevis 26 in the axial direction of the input rod 24 is substantially prevented.

The base plate 30 is connected to the end portion of the input rod 24 through a connecting member 40. The connecting member 40 is fixed to the input rod 24, and includes a first stop 42, a second stop 44, and an engaging portion located between the first and second stops 42, 44. The engaging portion slidably engages an opening formed through the base plate 30, so that the connecting member 40 is axially movable relative to the base plate 30 of the clevis 26, over a maximum distance determined by abutting contacts of the first and second stops 42, 44 with the base plate 30. The first stop 42 is brought into abutting contact with the base plate 30 when the clevis 26 and the input rod 24 are moved toward each other, while the second stop 44 is brought into abutting contact with the base plate 30 when the clevis 36 and the input rod 24 are moved away from each other.

A compression coil spring 46 is disposed between the base plate 30 and the connecting member 40, so that the base plate 30 and the connecting member 40 are normally biased in opposite axial directions away from each other, under a predetermined biasing force of the spring 46. Accordingly, the second stop 44 is normally held in abutting contact with the base plate 30.

Figure 3:
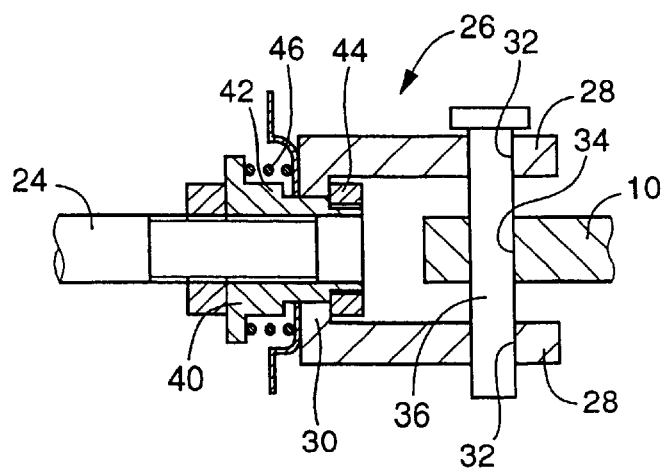
FIG. 3 is a fragmentary cross sectional plan view showing in enlargement a portion of the mechanism of FIG. 2.

Referring back to FIG. 2, the connecting member 40 carries a brake operating force switch 50 attached thereto. The switch 50 includes a housing 42, and a movable member 54 extending from the housing 52 toward the brake pedal 10. The switch 50 is attached to the connecting member 40 such that the axis or centerline of the movable member 54 is parallel to the axis of the connecting member 40, and such that the movable member 54 is engageable at its free end with a bracket 56 fixed to the base plate 30. The switch 50 is arranged and positioned so that the switch 50 is in an OFF state when the second stop 44 is in contact with the base plate 30 as shown in FIG. 3, and is brought into an ON state when the clevis 26 (base plate 30) has moved a predetermined distance toward the input rod 24 (first stop 42) from the position at which the switch 50 is in the OFF state (at which the second stop 44 is in contact with the base plate 30).

The brake operating force $F_P$ can be transmitted from the clevis 26 to the input rod 24 through the connecting member 40, more precisely, through the abutting contact of the base plate 30 with the first stop 42, only after the base plate 30 is brought into contact with the first stop 42. Since the force $F_P$ is transmitted from the clevis 26 to the input rod 24 through the first stop 42, the switch 50 is protected against exposure to an excessively large force during operation of the brake pedal 10.

The present braking system has two sub-systems, one of which includes two hydraulically operated brakes 58 for front wheels FL, FR shown in FIG. 1, and the other of which includes two hydraulically operated brakes for rear wheels (not shown). The two brakes 58 include respective front wheel brake cylinders 60 for respectively braking the front left and right wheels FL, FR. These front wheel brake cylinders 60 are connected to one of the two pressurizing chambers of the master cylinder 14. The brakes for the rear wheels include respective rear wheel brake cylinders (not shown) which are connected to the other pressurizing chamber of the master cylinder 14. Since the front and rear sub-systems are substantially identical in construction with each other, only the front sub-system for the front wheels FL, FR will be described by reference to FIG. 1, by way of example.

The master cylinder 14 is connected through a main fluid passage 64 to the wheel brake cylinders 60 for the front left and right wheels FL, FR. The main fluid passage 64 consists of a common passage 66 extending from the master cylinder 14, and two branch passages 68 extending from the end of the common passage 66 which is remote from the master cylinder 14. A fluid flow control valve in the form of a normally open solenoid-operated two-position valve 70 is connected to the common passage 66. This valve 70 includes a solenoid coil which produces a magnetic force for selectively placing the valve 70 in an open position and a closed position. The branch passages 68 are connected, at their ends remote from the common passage 66, to the respective wheel brake cylinders 60. A pump passage 72 is connected to a portion of the main fluid passage 64 between the two-position valve 70 and the wheel brake cylinders 60. A pump 74 is connected to the pump passage 72.

A check valve in the form of a by-pass valve 94 is provided so as to by-pass the two-position valve 70. This by-pass valve 94 is provided to permit a flow of a working fluid in a direction from the master cylinder 14 toward the wheel brake cylinders 60, even if the two-position valve 70 is closed due to a fluid force acting on a movable member of the valve 70, or is mechanically locked in its closed position, during an operation of the brake pedal 10.

A pressure relief valve in the form of a pressure difference generator valve 96 is also provided so as to by-pass the two-position valve 70. This pressure difference generator valve 96 is opened when the delivery pressure of the pump 74 is going to be higher than the pressure in the master cylinder 14 by more than a predetermined amount of pressure difference, so as to permit a flow of the working fluid from the pump 74 toward the master cylinder 14. The pressure difference generator valve 96 functions to maintain the difference between the pressure in the wheel brake cylinders 60 and the master cylinder 14 within a predetermined range, while the two-position valve 70 is in the closed position.

To a portion of each branch passage 68 between the wheel brake cylinder 60 and a point of connection of the branch passage 68 to the pump passage 72, there is connected a pressure holding valve 100 which is a normally open solenoid-operated shut-off valve. The pressure holding valve 100 is placed in its closed position when its solenoid coil is energized. In the closed position, the valve 100 inhibits a flow of the working fluid from the pump 74 toward the wheel brake cylinder 60, for thereby holding the pressure in the wheel brake cylinder 60 at the present level. A check valve in the form of a by-pass valve 104 is provided so as to by-pass each pressure holding valve 100. This by-pass valve 104 functions to permit a high rate of flow of the fluid from the wheel brake cylinder 60 back to the master cylinder 14 when the brake pedal 10 is released.

A reservoir passage 106 is connected at its one end to a portion of each branch passage 68 between the pressure holding valve 100 and the wheel brake cylinder 60, and at the other end to a reservoir 108. To each reservoir passage 106, there is connected a pressure reducing valve 110 which is a normally closed solenoid-operated shut-off valve. The pressure reducing valve 110 is placed in its open position when its solenoid coil is energized. In the open position, the valve 110 permits a flow of the working fluid from the wheel brake cylinder 60 toward the reservoir 108, for thereby reducing the pressure in the wheel brake cylinder 60.

The reservoir 108 includes a housing, and a reservoir piston 112 substantially fluid-tightly and slidably received within the housing. The reservoir piston 112 cooperates with the housing to define a reservoir chamber 114, and is biased by a spring 116 so that the working fluid is stored in the reservoir chamber 114 under pressure. The reservoir chamber 114 is connected through the pump passage 72 to the main fluid passage 64.

The pump passage 72 is divided by the pump 74 into a suction passage 120 and a delivery passage 122. A suction valve 124 and a delivery valve 126, which are both check valves, are provided in the respective suction and delivery passages 120, 122. Further, a damper 128 and an orifice 129 are provided in the delivery passage 122, in series connection with each other, for the purpose of reducing pressure pulsation of the fluid delivered from the pump 74.

A fluid supply passage 130 is connected at its one end to a portion of the suction passage 120 between the suction valve 124 and the reservoir 108, and at the other end to a portion of the main fluid passage 64 between the master cylinder 14 and the two-position valve 70. An inflow control valve 132, which is a normally closed solenoid-operated shut-off valve, is provided in the fluid supply passage 130. The inflow control valve 132 is controlled by an electronic control unit 200 (which will be described), such that the valve 132 is placed in the closed position when the pump 74 is required to pump up the fluid from the reservoir 108 while the pumping of the fluid supplied from the master cylinder 14 should be avoided, and such that the valve 132 is opened when the pump 74 is required to pump up the fluid from the master cylinder 14. A check valve 134 is provided in a portion of the suction passage 120 between the reservoir 108 and a point of connection of the suction passage 120 and the fluid supply passage 130. This check valve 134 functions to inhibit a flow of the fluid from the master cylinder 14 toward the reservoir 108 while the inflow control valve 132 is in the open position. Thus, the check valve 134 permits the pressurized fluid from the master cylinder 14 to be supplied to the pump 74, without a drop of the fluid pressure. It is noted that the reservoir passage 106 is connected to a portion of the suction passage 120 between the check valve 134 and the reservoir 108.

Figure 4:
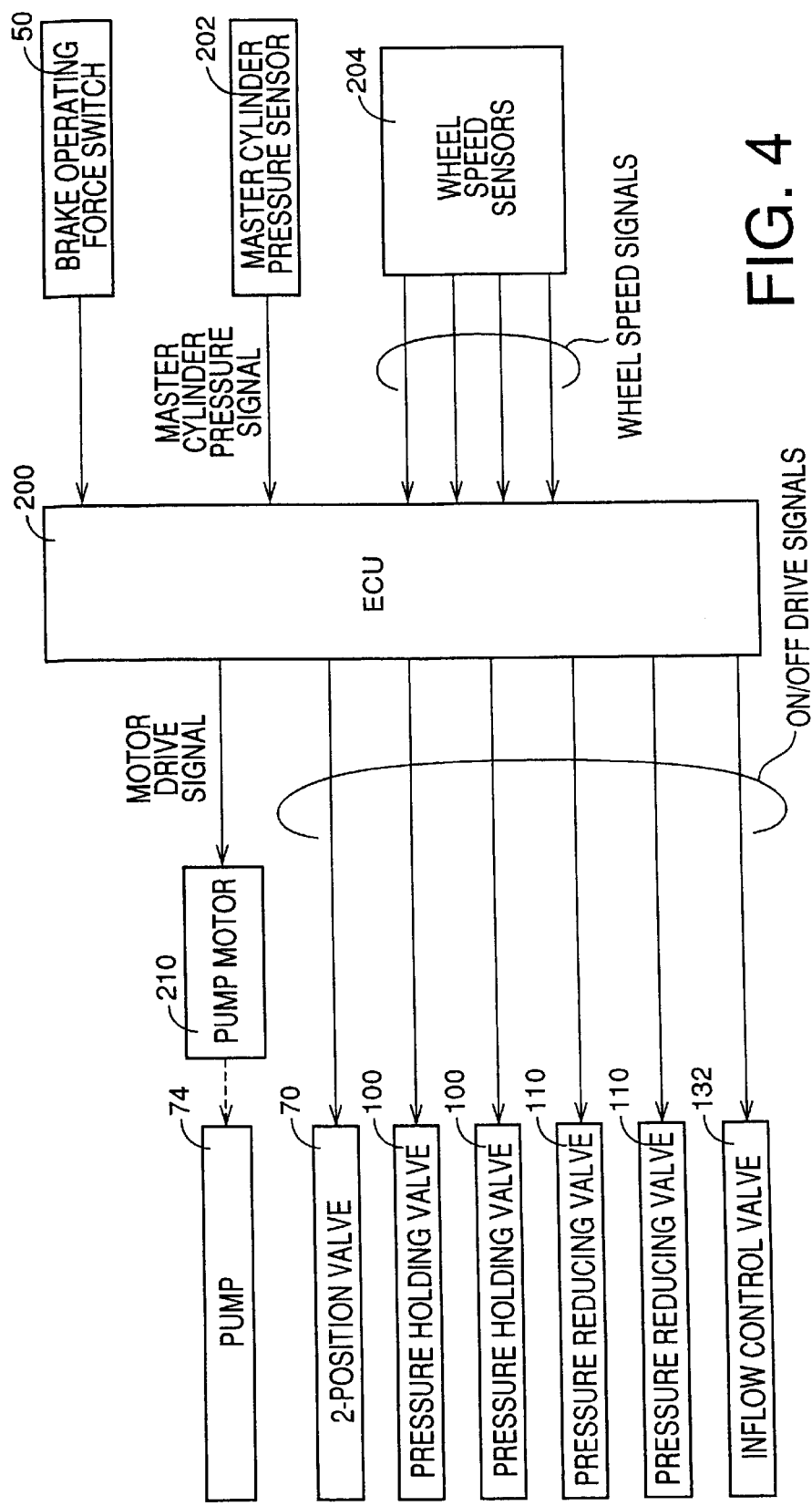
FIG. 4 is a block diagram showing a software arrangement of the braking system of FIG. 1.

While the hardware or mechanical arrangement of the present braking system has been described, a software arrangement of the braking system will be described by reference to the block diagram of FIG. 4, which shows only the sub-system for braking the front wheels FL, FR, by way of example.

As indicated above, the present braking system includes the electronic control unit (abbreviated as "ECU" in FIG. 4) 200, which is principally constituted by a computer incorporating a central processing unit (CPU), a read-only memory (ROM) and a random-access memory (RAM). The electronic control unit 200 is adapted to execute a braking effect characteristic control routine and an anti-lock braking pressure control routine, according to control programs stored in the ROM, while utilizing a temporary data storage function of the RAM. The term "braking effect characteristic control" is interpreted to mean controlling the pressures in the wheel brake cylinders 60, so as to restrain reduction of a braking effect provided by the wheel brake cylinders 60, which reduction may result from some abnormality or malfunction of the booster 12. The term "anti-lock braking pressure control" is interpreted to mean controlling the pressure in the wheel brake cylinder 60 for each wheel, so as to prevent an excessive locking tendency of the wheel during an operation of the brake pedal 10. In the present embodiment, the working fluid is recirculated through the braking circuit, by operation of the pump 74 while the braking system is operated in an anti-lock braking pressure control mode, namely, while the anti-lock braking pressure control routine is executed. The braking system is adapted to effect the braking effect characteristic control by utilizing the pump 74 during an operation of the brake pedal 10. Thus, the present embodiment utilizes the pump 74 for not only the braking effect characteristic control, but also the anti-lock braking pressure control.

To the input side of the electronic control unit 200, there are connected the brake operating force switch 50, a master cylinder pressure sensor 202 and wheel speed sensors 204. The master cylinder pressure sensor 202 is provided to detect the pressure in the master cylinder 14 or in any other portion of the braking system at which the pressure is substantially equal to the pressure in the master cylinder 14. The wheel speed sensors 204 are provided for detecting the rotating speeds of the respective four wheels of the automotive vehicle. Each sensor 204 generates an output signal indicative of the rotating speed of the corresponding wheel.

To the output side of the electronic control unit 200, there are connected an electric motor 210 for driving the pump 74. The driver circuit of the pump motor 210 receives a motor drive signal from the electronic control unit 200. To the output side of the electronic control unit 200, there are also connected the solenoid coils of the two-position valve 70, pressure holding valves 100, pressure reducing valves 110 and inflow control valve 132. The solenoid coils are energized according to ON/OFF drive signals received from the electronic control unit 200.

Figure 5:
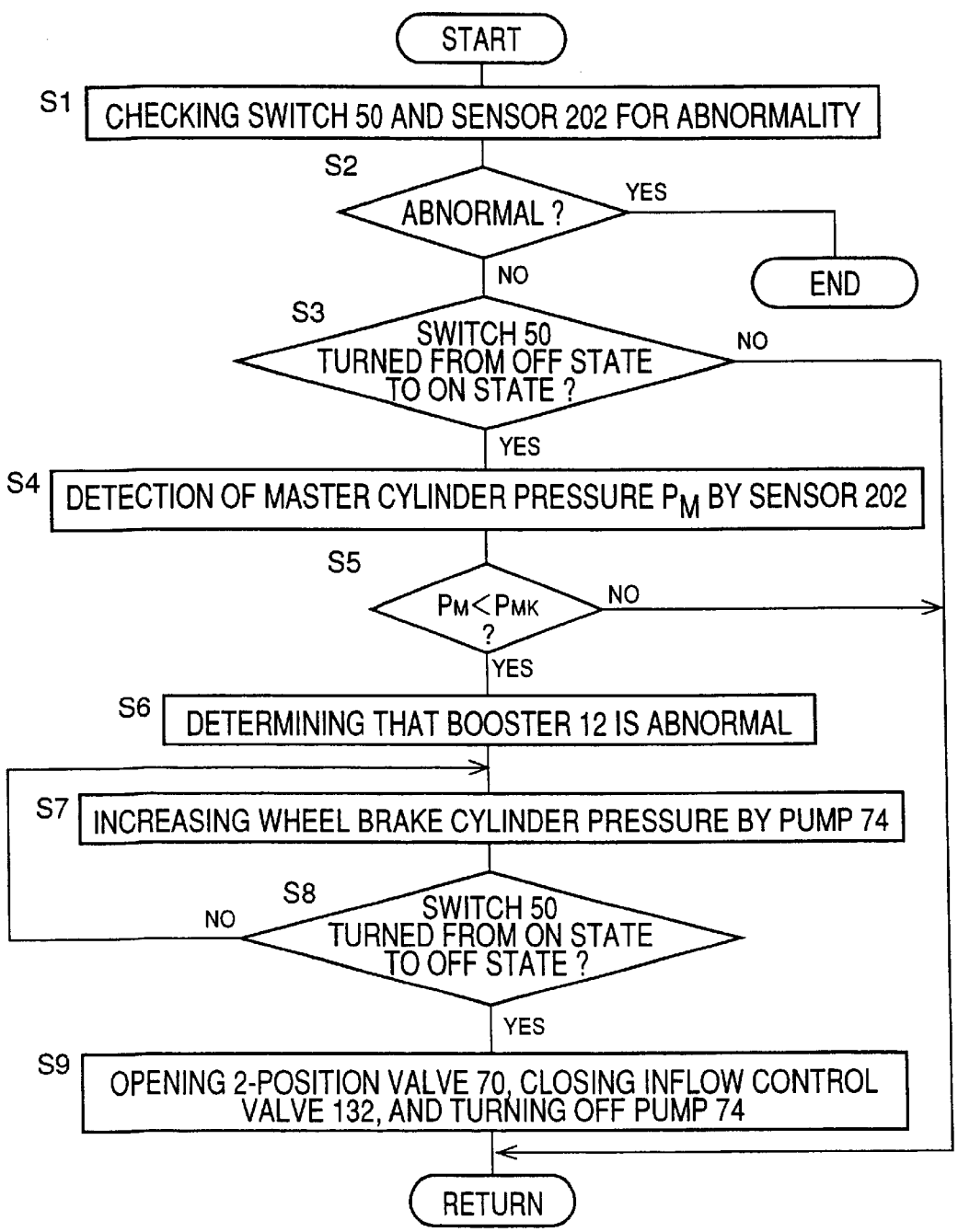
FIG. 5 is a flow chart illustrating a braking effect characteristic control routine executed according to a program stored in a ROM of a computer of an electronic control unit shown in FIG. 4.

The braking effect characteristic control routine is illustrated in the flow chart of FIG. 5. Before explaining this routine by reference to the flow chart, the concept of the routine will be first described briefly.

Figure 6:
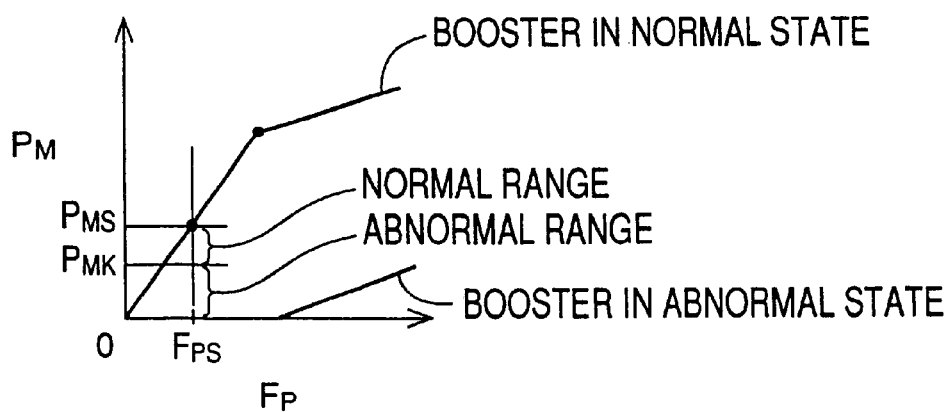
FIG. 6 is a graph for explaining the routine of FIG. 5.

The graph in FIG. 6 indicates a normal relationship and an abnormal relationship between the brake operating force $F_P$ and the pressure $P_M$ in the master cylinder 14, when the booster is in a normal state and in an abnormal state, respectively. In this specific example, it is assumed that the booster 12 is not at all capable of boosting the brake operating force $F_P$ when the booster 12 is in the abnormal state. It will be understood from the graph that the master cylinder pressure $P_M$ corresponding to a given value of the brake operating force $F_P$ is higher when the booster 12 is in the normal state than when it is in the abnormal state. When the booster 12 is in the normal state, the master cylinder pressure $P_M$ corresponding to a predetermined value $F_{PS}$ of the brake operating force $F_P$ is a normal value $P_{MS}$. In the present embodiment, the brake operating force switch 50 is adapted to detect a moment when the brake operating force $F_P$ has become equal to the predetermined value $F_{PS}$, so as to determine that the booster 12 is abnormal if the master cylinder pressure $P_M$ is lower than a predetermined lower limit $P_{MK}$ when the brake operating force $F_P$ is equal to the predetermined value $F_{PS}$. The lower limit $P_{MK}$ is lower than the normal value $P_{MS}$.

For the brake operating force switch 50 to detect that the brake operating force $F_P$ is equal to the predetermined value $F_{PS}$, a set load $F_{SET}$ of the spring 46 is determined so as to satisfy the following equation:

$$F_{SET} = F_{PS} \times R_P$$

More precisely, however, the set load $F_{SET}$ does not coincide with a value obtained according to the above equation, since the brake pedal 10 is biased by a return spring (not shown) toward its non-operated position. That is, the set load $F_{SET}$ is obtained by subtracting an appropriate value attributed to the return spring, from a value obtained according to the above equation.

The predetermined value $F_{PS}$ is determined such that the brake operating force $F_P$ necessarily exceeds this value $F_{PS}$ during an ordinary operation of the brake pedal 10 when the booster 12 is normally functioning. Described in detail, the predetermined value $F_{PS}$ is determined to be smaller than a value of the brake operating force $F_P$ at which an increase in the master cylinder pressure $P_M$ is initiated during an increase in the brake operating force $F_P$, when the brake operating force $F_P$ is transmitted to the master cylinder 14, without any boosting of the brake operating force $F_P$ due to any abnormality of the booster 12. In this specific embodiment, the predetermined value $F_{PS}$ is determined to be 5 kgf.

Figure 7:
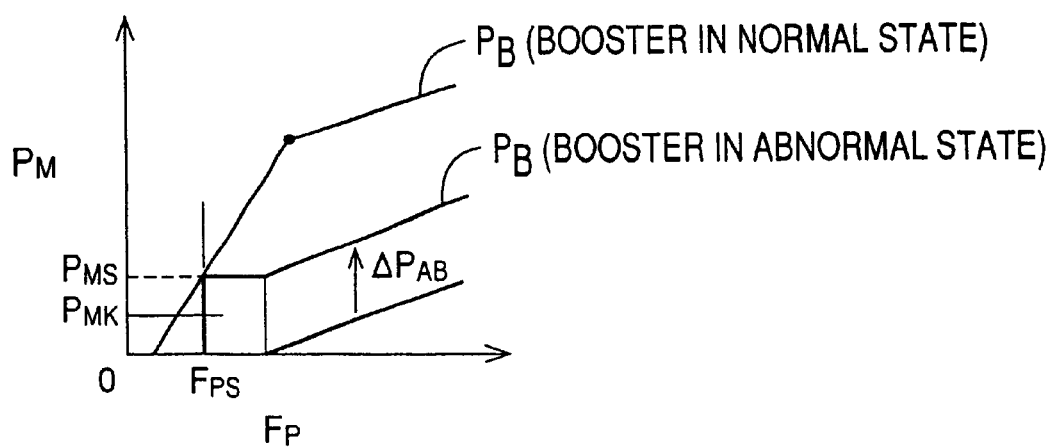
FIG. 7 is another graph for explaining the routine of FIG. 5.

The present embodiment is further adapted such that upon detection that the booster 12 is abnormal, the two-position valve 70 is closed, and the pump 74 is operated to assure that the pressure $P_B$ in the wheel brake cylinders 60 is higher than the master cylinder pressure $P_M$ by a fixed pressure difference $\Delta P_{AB}$, as shown in the graph of FIG. 7. The fixed pressure difference $\Delta P_{AB}$ is determined by the pressure difference generator valve 96. Thus, the present embodiment is adapted to at least restrict or reduce the amount of reduction in the braking effect due to abnormality of the booster 12.

The pump 74 is activated to increase the pressure $P_B$ in the wheel brake cylinders 60, immediately after the abnormality of the booster 12 is detected, as indicated in FIG. 7. Based on this arrangement, the fixed pressure difference $\Delta P_{AB}$ is determined not to be larger than the normal value $P_{MS}$ of the master cylinder pressure $P_M$ which is taken when the brake operating force $F_P$ is equal to the predetermined value $F_{PS}$ where the booster 12 is in the normal state.

However, an increase of the wheel brake cylinder pressure $P_B$ by the pump 74 may be initiated a suitable time after the detection that the booster 12 is abnormal, for instance, when the master cylinder pressure $P_M$ has been increased to a predetermined value which is higher than the atmospheric pressure.

The fixed pressure difference $\Delta P_{AB}$ may be determined according to various design concepts. For instance, the fixed pressure difference $\Delta P_{AM}$ may be determined so that the master cylinder 14 generates a minimum pressure $P_M$ required to brake the wheels, when the brake operating force $F_P$ is within a nominal value (within a range of 40–60 kgf, for example) where the booster 12 is abnormal, completely failing to perform a boosting function.

The braking effect characteristic control routine will be described in detail by reference to the flow chart of FIG. 5.

This routine is repeatedly executed after an ignition switch provided on the vehicle is turned on by the vehicle operator. Each cycle of execution of the routine is initiated with step S1 to check the brake operating force switch 50 and the master cylinder pressure sensor 202 for any abnormality such as electrical disconnection or short-circuiting. This checking is effected while the brake pedal 10 is in the non-operated position. Step S1 is followed by step S2 to determine whether any abnormality of the switch 50 or sensor 202 was detected in step S1. If an affirmative decision (YES) is obtained in step S2, the present routine is terminated, and the routine is not initiated until the ignition switch is turned on again after it is turned off. Thus, an operation to increase the wheel brake cylinder pressure $P_B$ by the pump 74 in step S7 is inhibited as long as the switch 50 and/or the sensor 202 is/are abnormal.

If a negative decision (NO) is obtained in step S2, the control flow goes to step S3 to determine whether the brake operating force switch 50 has been turned ON, more specifically, has been turned from the OFF state to the ON state. That is, step S3 is provided to determine whether the brake operating force $F_P$ has increased to the predetermined value $F_{PS}$. If the switch 50 is in the OFF state, a negative decision (NO) is obtained in step S3, and one cycle of execution of the present routine is terminated. If the switch 50 has been turned ON in a subsequent cycle of execution of the routine, the control flow goes to step S4 to detect the master cylinder pressure P on the basis of the output signal (analog signal) of the master cylinder pressure sensor 202. The level of this analog output signal continuously changes with a continous change in the master cylinder pressure $P_M$.

Then, the control flow goes to step S5 to determine whether the detected master cylinder pressure $P_M$ is lower than the predetermined lower limit $P_{MK}$, that is, to determine whether the booster 12 is in the abnormal state. If the detected master cylinder pressure $P_M$ is equal to or higher than the lower limit $P_{MK}$, that is, if a negative decision (NO) is obtained in step S5, one cycle of execution of the present routine is terminated. If the master cylinder pressure $P_M$ is lower than the lower limit $P_{MK}$, that is, if an affirmative decision (YES) is obtained in step S5, the control flow goes to step S6 to determine that the booster 12 is in the abnormal state, and activate a suitable alarm indicator to inform the vehicle operator that the booster 12 is abnormal.

Step S6 is followed by step S7 in which the pump 74 is activated to increase the pressure $P_B$ in the wheel brake cylinders 60, more specifically, to close the two-position valve 70, open the inflow control valve 132, and activate the pump 74. As a result, the pressure $P_B$ in the wheel brake cylinders 60 is raised such that the wheel brake cylinder pressure $P_B$ is higher than the master cylinder pressure $P_M$ by the fixed pressure difference $\Delta P_{AB}$. Then, the control flow goes to step SB to determine whether the brake operating force switch 50 has been turned OFF, that is, to determine whether the pump 74 should be turned off. If a negative decision (NO) is obtained in step S8, the control flow goes to step S7. Steps S7 and S8 are repeatedly implemented until an affirmative decision (YES) is obtained in step S8, that is, until the switch 50 has been turned OFF. When the affirmative decision (YES) is obtained in step S8, the control flow goes to step S9 to terminate the operation to increase the wheel brake cylinder pressure $P_B$ by the pump 74, more specifically, to open the two-position valve 70, close the inflow control valve 132 and turn off the pump 74. Thus, one cycle of execution of the routine is terminated.

The anti-lock brake pressure control routine is initiated for any one of the wheels, during an operation of the brake pedal 10, when an excessive locking tendency of that wheel is detected. This routine is formulated to control the pressure $P_B$ in the locking wheel, by selectively establishing one of a pressure increasing state, a pressure holding state and a pressure reducing state, so as to eliminate the excessive locking tendency of the wheel, while monitoring the rotating speed of the wheel in question on the basis of the output signal of the corresponding wheel speed sensor 204, and the vehicle running speed. The pressure increasing state is established by opening the pressure holding valve 100 and closing the pressure reducing valve 110. The pressure holding state is established by closing both of the pressure holding and reducing valves 100, 110. The pressure reducing state is established by closing the pressure holding valve 100 and opening the pressure reducing valve 110. In the anti-lock brake pressure control mode, the pump motor 210 is activated, and the working fluid is returned by the pump 74 from the reservoir 108 to the main fluid passage 64.

It will be understood from the foregoing description of the present embodiment that the brake operating force $F_P$ is considered to be an input to the booster 12, while the master cylinder pressure $P_M$ is considered to be an output from the booster 12, and that the brake operating force switch 50, the master cylinder pressure switch 202 and a portion of the electronic control unit 200 assigned to implement steps S3–S6 of the routine of FIG. 5 cooperate with each other to provide a booster diagnosing device.

There will next be described a braking system according to a second embodiment of this invention, which is similar to the braking system of the first embodiment in many aspects. That is, the second embodiment is different from the first embodiment, in some mechanical elements associated with the brake operating force switch. In the interest of simplification of the description, only these elements will be described, and no redundant description of the similar elements will be provided, with the same reference signs as used in the first embodiment being used in the second embodiment to identify the similar elements.

Figure 8:
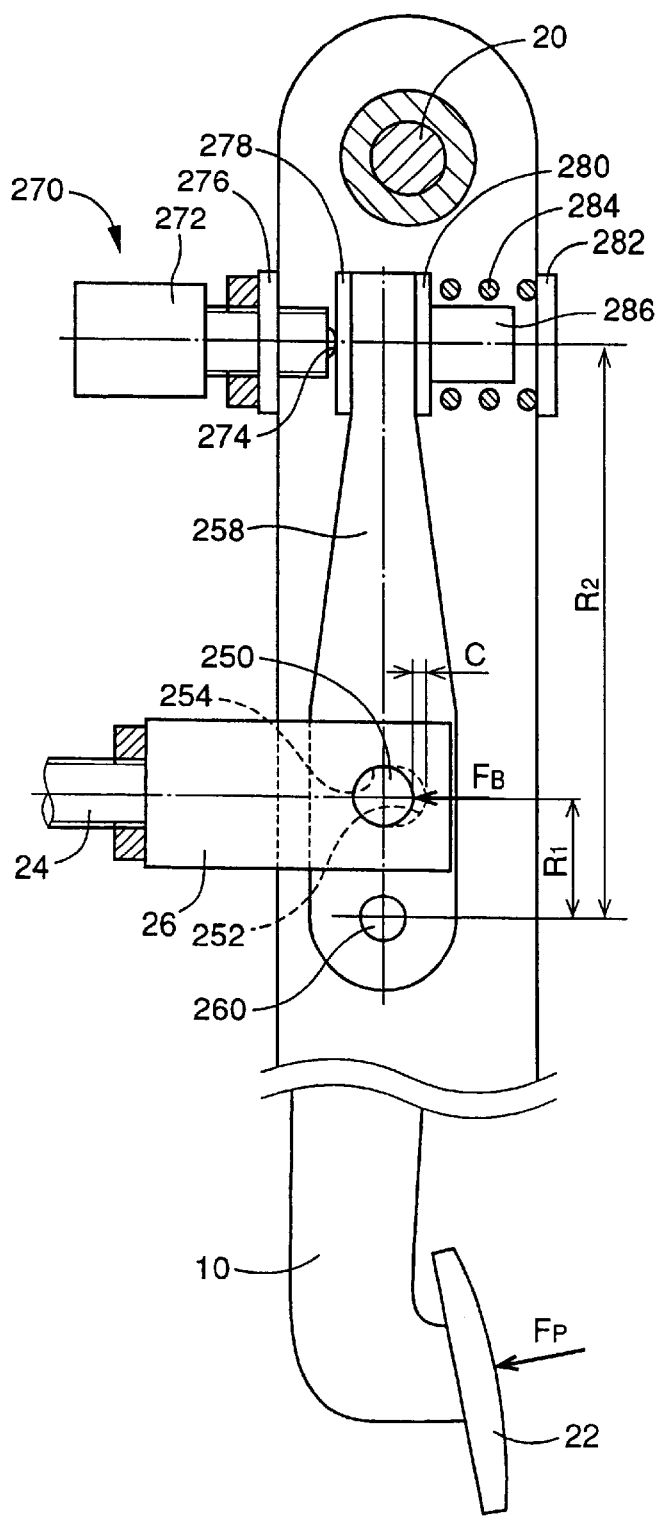
FIG. 8 is a side elevational view showing a brake pedal, a booster input rod, a lever, and an operating force switch in a braking system according to a second embodiment of this invention.

In the present second embodiment, the brake pedal 10 is connected to the clevis 26 by engagement of a pin 250 with an elongate hole 252, as shown in FIG. 8, so as to permit a relative movement of the brake pedal 10 and the clevis 26 in the axial direction of the input rod 24 by a predetermined maximum distance. Described more specifically referring to FIG. 9, the side plates 28, 28 of the clevis 26 have respective round holes 254, 254 which are concentric with each other in a direction perpendicular to the axial direction of the input rod 24. These round holes 254 have a diameter slightly larger than the diameter of the pin 250. The elongate hole 252 is formed through the brake pedal 10 such that the hole 252 is elongated in the axial direction of the input rod 24, as indicated in FIG. 8. The pin 250 extends through the round holes and the elongate hole 252.

To the brake pedal 10, there is attached a generally plate-like lever 258 such that the brake pedal 10 and the lever 258 are spaced apart from each other by a suitable distance in the direction perpendicular to the axial direction of the input rod 24. A pin 260 extends through the brake pedal 10 and an end portion of the lever 258 which is nearer to the pedal pad 22. Thus, the lever 258 is pivotable relative to the brake pedal 10 about an axis of the pin 260 which is parallel to the pin 20. The pin 260 is located such that the extension line of the axis of the input rod 24 is located between the pin 20 and the pin 260, as shown in FIG. 8.

The lever 258 has a round hole 264 formed in a longitudinally intermediate portion thereof, such that the round hole 264 is coaxial with the pin 250. The pin 250 extends through this round hole 264 as well. The round hole 264 has a diameter slightly larger than the diameter of the pin 250. In this arrangement, the lever 258 is pivotable relative to the clevis 26 and is movable with the clevis 26 in the axial direction of the input rod 24. A spacer 266 is fitted on the pin 250 and interposed between the brake pedal 10 and the lever 258, so as to keep a clearance therebetween.

The elongate hole 252 is desirably formed in the brake pedal 10, so as to have an inner surface which follows an arc of a circle whose center lies on the axis or centerline of the pin 260. In this respect, it is noted that the center of the round hole 264 through which the pin 250 extends takes a path following the above-indicated arc when the lever 258 is pivoted about the axis of the pin 260.

As shown in FIG. 8, a brake operating force switch 270 is fixed to the brake pedal 10, such that the switch 270 is located near the free end portion of the lever 258. Like the switch 50, this switch 270 includes a housing 272 and a movable member 274 extending from the housing 272 such that the movable member 274 is movable relative to the housing 272. The movable member 274 is biased by a spring (not shown) in a direction away from the housing 272. The housing 272 is fixed to a switch mount 276 provided on the brake pedal 10.

The lever 258 has a pair of engaging portions 278, 280 formed at its free end portion. The engaging portions 278, 280 cooperate with the other portion of the free end portion of the lever 258 to define a U-shaped structure wherein the engaging portions 278, 280 are parallel with each other and perpendicular to the above-indicated other portion of the free end portion, which is parallel to the other portion of the lever 258.

The movable member 274 is normally held in contact with the engaging portion 278 which is located to the left of the other engaging portion 280, as seen in FIG. 8. When the brake pedal 10 is depressed, the lever 258 is pivoted about the pin 260 in the clockwise direction (as seen in FIG. 8), that is, in the direction from the engaging portion 278 toward the engaging portion 280. Unlike the movable member 54 of the switch 50 in the first embodiment, the movable member 274 is normally or initially placed in its fully retracted position on the side of the housing 272, so that the switch 270 is placed in its OFF state. When the lever 258 is pivoted about the pin 260 in the clockwise direction from the initial or original position of FIG. 8, the movable member 274 is moved away from the housing 272 and toward its fully advanced position by the biasing force of the above-indicated spring, whereby the switch 270 is placed in its ON state.

The brake pedal 10 has a spring seat 282 which is spaced apart from and opposed to the engaging portion 280 of the lever 258. A spring 284 is interposed between the engaging portion 280 and the spring seat 282, and held therebetween by a spring holder 286. In this embodiment, the spring holder 286 is fixed to the engaging portion 280, so as to extend through a space within the spring 284 toward the spring seat 282. The spring holder 286 has a length determined to prevent its abutting contact with the spring seat 282 even when the lever 258 is pivoted by maximum angle as a result of an operation of the brake pedal 10, so that the lever 258 is protected from an excessively large load.

Like the brake operating force switch 50 provided in the first embodiment, the brake operating force switch 270 in the present second embodiment generates an OFF signal when the brake operating force $F_P$ is smaller than the predetermined value $F_{PS}$, and an ON signal when the force $F_P$ is equal to or larger than the value $F_{PS}$. To this end, a set load $F_{SET}$ of the spring 284 is determined so as to satisfy an equation $F_{SET}=F_{PS} \times R_P \times (R1/R2)$, wherein "R1" represents a distance between the centerline of the pin 260 and the centerline of the pin 250 (center of the round hole 264), and "R2" represents a distance between the centerline of the pin 260 and a point of contact between the engaging portion 278 and the movable member 274.

The lever 258 is designed such that the distance R2 is larger than the distance R1. That is, the ratio R1/R2 in the above equation is selected to be smaller than "1", so that the elastic force of the spring 284 is boosted by the lever 258 before the elastic force is transmitted to the pin 250. This design of the lever 258 permits reduction of the required size of the spring 284 corresponding to the predetermined value $F_{PS}$.

There will be described actions of the brake pedal 10, lever 258, clevis 26 and input rod 24, in the present second embodiment.

When the brake pedal 10 is placed in the non-operated position of FIG. 8, there exists a clearance C between the outer circumferential surface of the pin 250 and the inner surface of the elongate hole 252. As the brake pedal 10 is operated from the non-operated position, the brake pedal 10 is pivoted about the pin 260 in the clockwise direction. In an initial period of this pivotal movement of the brake pedal 10, that is, while a force transmitted from the engaging portion 280 at the free end portion of the lever 258 to the spring 284 is smaller than the set load $F_{SET}$, the lever 258 is pivoted together with the brake pedal 10, and the pin 250 is moved with the pivotal movement of the lever 258. In this initial period of the pivotal movement of the brake pedal 10, the clearance C between the pin 250 and the elongate hole 252 of the brake pedal 10 is maintained, and the movement of the pin 250 causes the clevis 26 and the input rod 24 to be moved or advanced together toward the booster 12.

When the force transmitted from the engaging portion 280 to the spring 284 exceeds the set load $F_{SET}$ as a result of a further depressing operation on the brake pedal 10, the lever 258 is pivoted about the pin 260 by the brake pedal 10 in the same direction as the brake pedal 10, that is, in the clockwise direction, while the pin 250, clevis 26 and input rod 24 are maintained at the same positions. This pivotal movement of the lever 250 continues until the clearance C is zeroed. Thereafter, the brake pedal 10 and the lever 258 are pivoted together in the clockwise direction, and the pin 250, clevis 26 and input rod 24 are advanced together toward the booster 12.

Figure 10:
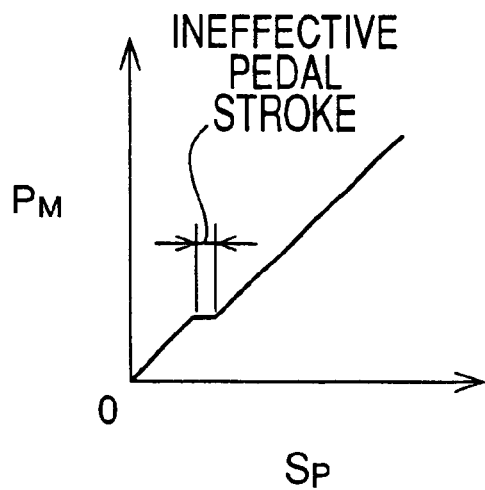
FIG. 10 is a graph indicating a relationship between an operating stroke $S_P$ of the brake pedal and a master cylinder pressure $P_M$ in the braking system of FIG. 8.

As indicated in the graph of FIG. 10, the master cylinder pressure $P_M$ does not increase during a portion of an operating stroke $S_P$ of the brake pedal 10, which portion corresponds to a time period during which the pin 250 is moved relative to the elongate hole 252 over a distance equal to the clearance C, that is, a time period from a moment at which the reduction of the clearance C is initiated to a moment at which the clearance C is completely eliminated or zeroed. Thus, during the above-indicated portion of the operating stroke $S_P$ of the brake pedal 10, the brake operating force $F_P$ is consumed by the compressive deformation of the spring 284. This portion of the operating stroke $S_P$ is considered to be an ineffective stroke of the brake pedal 10 during an operation of the brake pedal 10.

The ineffective pedal stroke increases with an increase in the initial clearance C. In this respect, it is noted that the clearance C is represented by an equation $C=S_{SW} \times (R1/R2)$, wherein "$S_{SW}$" represents a distance of movement or stroke of the engaging portion 278 required for the switch 270 to be turned from the OFF state to the ON state. As described above, the ratio "R1/R2" is smaller than "1", so that the distance of the relative movement of the brake pedal 10 and the clevis 26 is boosted or magnified into the distance of movement of the engaging portion 278, so that the clearance C is made smaller than the above-indicated required stroke $S_{SW}$ of the engaging portion 278, that is, smaller than the required operating stroke $S_{SW}$ of the switch 270, whereby the ineffective stroke of the brake pedal 10 is reduced.

In the second embodiment, the lever 258 is held on the brake pedal 10 and prevented from freely moving relative to the brake pedal 10, even in the absence of the pin 250, during an assembling operation to connect the brake pedal 10 to the clevis 26, because the lever 258 is kept at the position of FIG. 8 by the pin 260 at its fixed end portion, and by the cooperation of the brake operating switch 270 and the spring 284 at its free end portion. In particular, it is noted that the free end portion of the lever 258 is held in position while being squeezed by and between the movable member 274 biased toward to the engaging portion 278 and the spring 284 whose elastic force acts on the engaging portion 280. Accordingly, the brake pedal 10 with the lever 258 in the present embodiment can be assembled with the clevis 26, as easily as the brake pedal 10 used in the first embodiment or the conventional braking system.

It will be understood from the foregoing description of the present second embodiment that the clevis 26 serves as a connecting member connecting the input rod 24 and the brake operating member in the form of the brake pedal 10, while the lever 258 serves as a pivotal member attached to the brake operating member pivotally about an axis perpendicular to the axis of the input rod 24. It will also be understood that the spring 284 functions as an elastic member for biasing the pivotal member, and that the brake operating force switch 270 serves as a switch for detecting that the input to the booster 12 has increased to a predetermined value, while the master cylinder pressure sensor 202 serves as a sensor for detecting the output of the booster 12.

It will further be understood that the brake operating force switch 270 serves as a signal generating device for generating a signal relating to the brake operating force $F_P$ which is considered to be the input to the booster 12.

Figure 11:
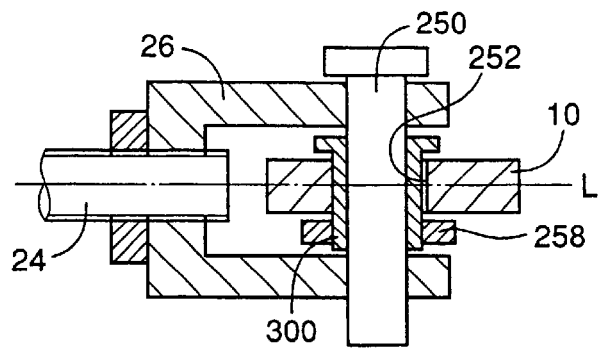
FIG. 11 is a fragmentary cross sectional plan view of one modification of the mechanism of FIG. 9.

Various changes may be made in the present second embodiment of the invention. A first modification shown in FIG. 11 uses a collar 300 which extends through the elongate hole 252 of the brake pedal 10 and the round hole 264 of the lever 258. In this modification, the pin 250 inserted through the collar 300 and the round holes 254 of the clevis 26. This modification makes it possible to reduce the diameter of the pin 250.

Figure 9:
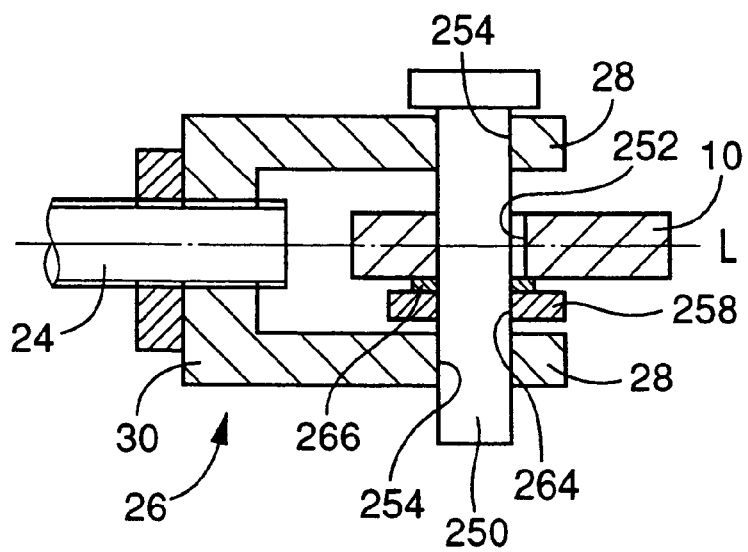
FIG. 9 is a fragmentary cross sectional plan view of a mechanism connecting the brake pedal, input rod and lever of FIG. 8.
Figure 12:
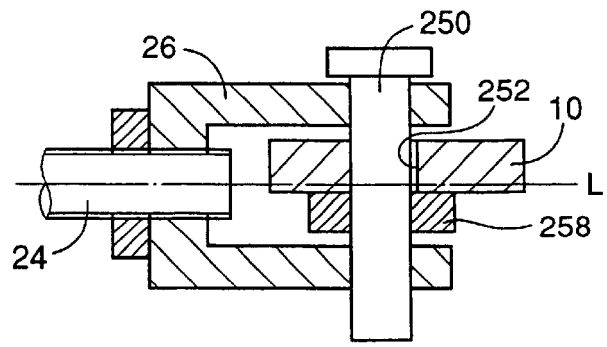
FIG. 12 is a fragmentary cross sectional plan view of another modification of the mechanism of FIG. 9.

While the second embodiment of FIGS. 8–9 is designed such that the axis L of the input rod 24 is aligned with the centerline of the brake pedal 10 passing the center of its thickness, the second embodiment may be modified such that the axis L of the input rod 24 is aligned with the center of the total thickness of the brake pedal 10 and the lever 258, as shown in FIG. 12.

Figure 13:
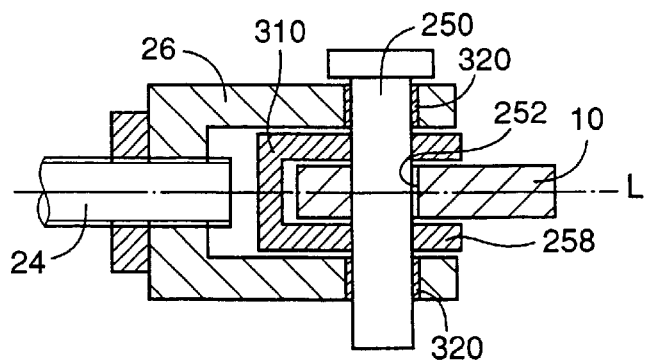
FIG. 13 is a fragmentary cross sectional plan view of a further modification of the mechanism of FIG. 9.

A third modification of the second embodiment is shown in FIG. 13, wherein a lever 310 having a C-shaped structure is used in place of the lever 258. In this third modification, a width portion of the brake pedal 10 located on the side of the input rod 24 is accommodated in the C-shaped structure of the lever 310, which is C-shaped in the transverse cross section as shown in FIG. 13, such that the C-shaped structure is open on its end remote from the input rod 24. Thus, the third modification is arranged such that the axis L of the input rod 24 is aligned with the thickness centers of the brake pedal 10 and the lever 310. The clevis 26 in this modification has bushings 320 fitted in the round holes 254, and the pin 250 extends through these bushings 320.

There will next be described a braking system according to a third embodiment of this invention, which is similar to the braking system of the second embodiment in many aspects. That is, the third embodiment is different from the second embodiment, in some mechanical elements associated with the brake operating force switch. Only these elements will be described, and no redundant description of the similar elements will be provided, with the same reference signs as used in the second embodiment being used in the third embodiment to identify the similar elements.

Figure 14:
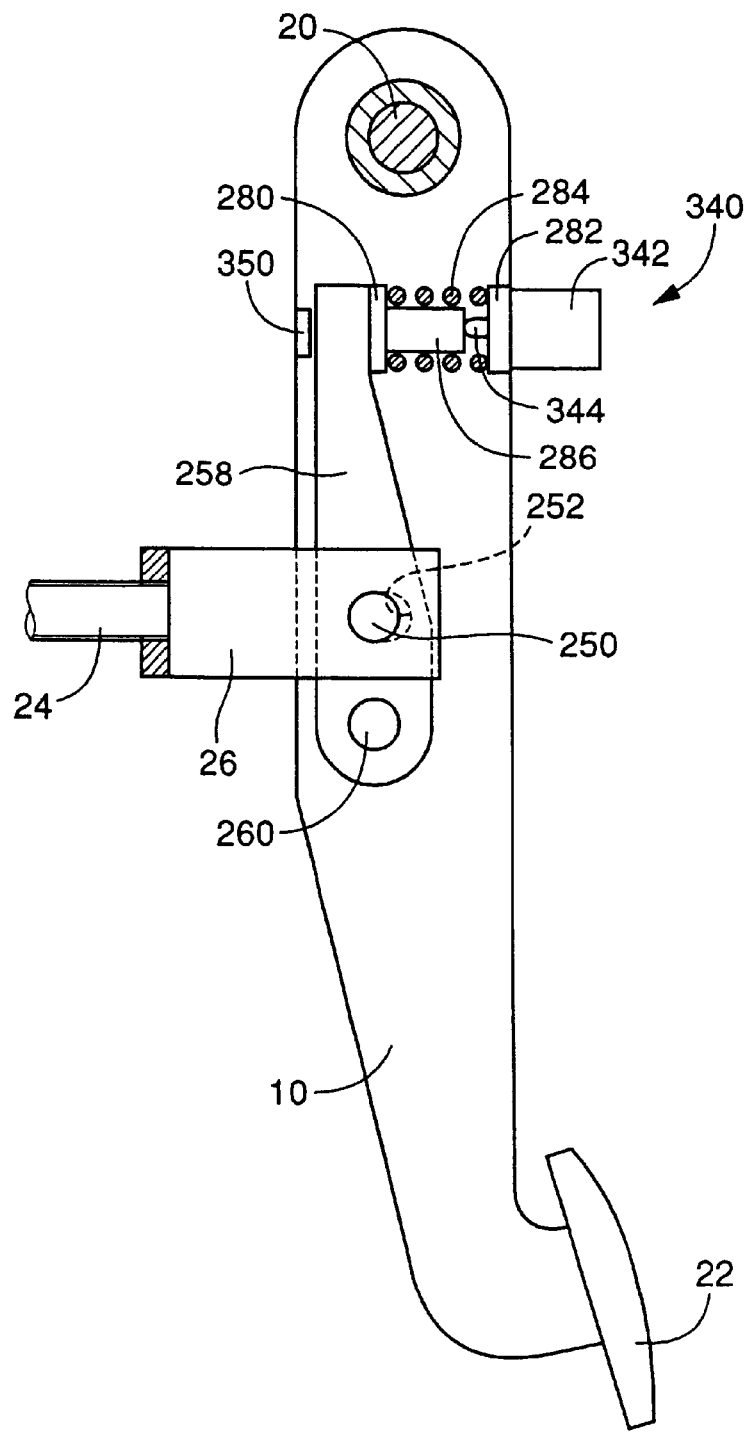
FIG. 14 is a side elevational view showing a brake pedal, a booster input rod, a lever, a clevis and an operating force switch in a braking system according to a third embodiment of the invention.

As shown in FIG. 14, the third embodiment uses a brake operating force switch 340 attached to the spring seat 282 which has been described above with respect to the first embodiment. Thus, the spring seat 282 functions as a mount for attaching the switch 340, as well as the seat for the spring 284. The switch 340 has a housing 342, and a movable member 344 extending from the housing 342 through the spring 284 toward the spring holder 286 which extends from the portion engaging 280 of the lever 258. Thus, the spring holder 286 functions as an engaging portion engageable with the movable member 344, as well as the holder for holding the spring 284. In the present third embodiment, the lever 258 does not have the engaging portion 278.

Like the brake operating force switch 270 in the second embodiment, the brake operating force switch 340 is placed in the OFF state when the brake operating force $F_P$ is smaller than the predetermined value $F_{PS}$, and is placed in the ON state when the force $F_P$ is equal to or larger than the predetermined value $F_{PS}$. In the present third embodiment, a clockwise pivotal movement of the brake pedal 10 causes a clockwise pivotal movement of the lever 258, resulting in the free end portion of the lever 258 to move toward the brake operating force switch 340. This movement of the free end portion of the lever 258 toward the switch 340 is different from the movement of the free end portion of the lever 258 away from the switch 270 in the second embodiment. In this third embodiment, therefore, the switch 340 is placed in the OFF state when the movable member 344 is placed in the original advanced position, and is turned to the ON state when the movable member 344 has been pressed toward the housing 342 by the spring holder 286 to its fully retracted position.

In the embodiment of FIG. 14, the lever 258 is biased at its free end portion by the spring 284 in the counterclockwise direction. To hold the lever 258 in its original position against the biasing force of the spring 284, a stop 350 is provided on the brake pedal 10 (at the position of the switch mount 276 in the second embodiment).

There will next be described a braking system according to a fourth embodiment of this invention, which is similar to the braking system of the first embodiment in many aspects. In the interest of simplification of the description, only those elements which are characteristic of the present fourth embodiment will be described, with the same reference signs as used in the first embodiment being used in the fourth embodiment to identify the similar elements.

Figure 15:
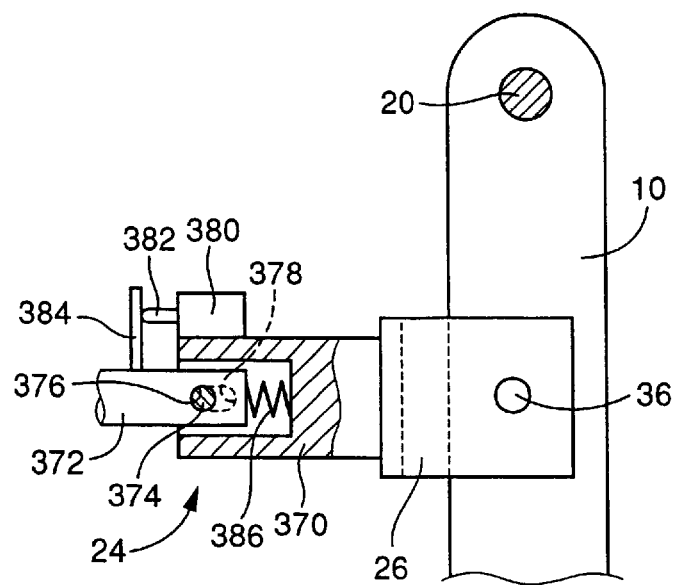
FIG. 15 is a side elevational view showing a brake pedal, a booster input rod, a clevis and an operating force switch in a braking system according to a fourth embodiment of the invention.

In the present fourth embodiment, the input rod 24 consists of a first portion 370 on the side of the clevis 26, and a second portion 372 on the side of the booster 12, as shown in FIG. 15. The end portion of the second portion 372 on the side of the first portion 370 is accommodated in a hole formed in the end portion of the first portion 370. The first and second portions 370, 372 are connected to each other by a connecting member in the form of a pin 374 which extends through a round hole 376 formed through the second portion 372, and elongate holes 378 formed through the first portion 370. The round hole 376 formed in a diametric direction of the input rod 24 has a diameter only slightly larger than the diameter of the pin 374, while the elongate holes 378 formed through the cylindrical wall of the first portion 370 are elongated in the axial direction of the input rod 24. This arrangement permits a relative movement of the first and second portions 370, 372 in the axial direction over a predetermined maximum distance. A brake operating force switch 380 is fixed on the first portion 370, while an engaging member 384 is fixed on the second portion 372 such that a movable member 382 of the switch 380 is engageable with the engaging member 384. Thus, the switch 380 is turned ON and OFF depending upon a distance of relative movement of the first and second portions 370, 372 of the input rod 24. A spring 386 is interposed between the first and second portions 370, 372, as a biasing member biasing the two portions 370, 372 in opposite directions away from each other. The first portion 370 is connected to the clevis 26 such that a relative movement thereof in the axial direction of the input rod 24 is substantially inhibited.

There will next be described a braking system according to a fifth embodiment of this invention, which is similar to the braking system of the first embodiment in many aspects. In the interest of simplification of the description, only those elements which are characteristic of the present fifth embodiment will be described, with the same reference signs as used in the first embodiment being used in the fifth embodiment to identify the similar elements.

Figure 16:
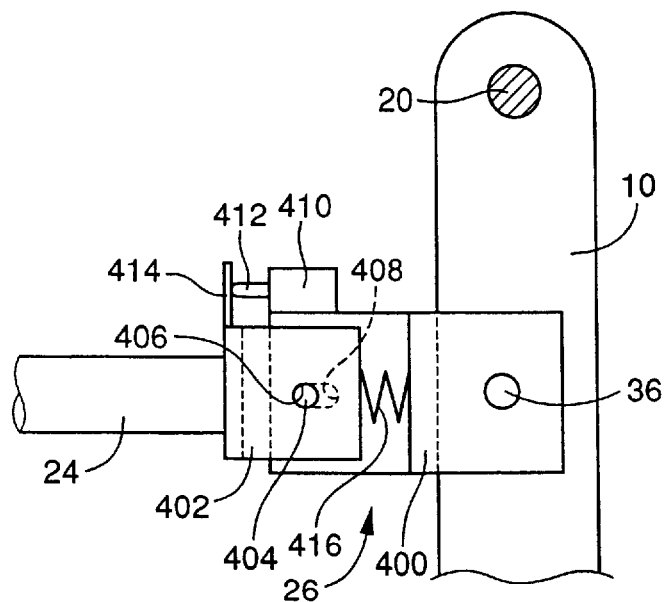
FIG. 16 is a side elevational view showing a brake pedal, a booster input rod, a clevis and an operating force switch in a braking system according to a fifth embodiment of this invention.

In the present fifth embodiment, the clevis 26 consists of a first portion 400 on the side of the brake pedal 10, and a second portion 402 on the side of the input rod 24, as shown in FIG. 16. The end portion of the second portion 402 on the side of the first portion 400 is accommodated in a hole formed in the end portion of the first portion 400. The first and second portions 400, 402 are connected to each other by a connecting member in the form of a pin 404 which extends through a round hole 406 formed through the second portion 402, and elongate holes 408 formed through the first portion 400. The round hole 406 formed in a diametric direction of the input rod 24 has a diameter only slightly larger than the diameter of the pin 404, while the elongate holes 408 formed through the cylindrical wall of the first portion 400 are elongated in the axial direction of the input rod 24. This arrangement permits a relative movement of the first and second portions 400, 402 in the axial direction over a predetermined maximum distance. A brake operating force switch 410 is fixed on the first portion 400, while an engaging member 414 is fixed on the second portion 402 such that a movable member 412 of the switch 410 is engageable with the engaging member 414. Thus, the switch 410 is turned ON and OFF depending upon a distance of relative movement of the first and second portions 400, 402 of the clevis 26. A spring 416 is interposed between the first and second portions 400, 402, as a biasing member biasing the two portions 400, 402 in opposite directions away from each other. The first portion 400 is connected to the brake pedal 10 such that a relative movement thereof in the axial direction of the input rod 24 is substantially inhibited. Further, the second portion 402 is connected to the input rod 24 such that a relative movement thereof in the axial direction is substantially inhibited.

While the several embodiments of this invention have been described above in detail by reference to the accompanying drawings, it is to be understood that the invention is not limited to the details of the illustrated embodiments, but may be embodied with various changes, modifications and improvements which may occur to those skilled in the art, without departing from the sprit and scope of the invention defined in the following claims.

What is claimed is:

1. A braking system of an automotive vehicle including a brake operating member, a booster for boosting a brake operating force acting on said brake operating member, a master cylinder for producing a hydraulic pressure on the basis of an input force received from said booster as a result of boosting of said brake operating force by said booster, and a wheel brake cylinder which is activated by the hydraulic pressure produced by said master cylinder, to brake a wheel of the automotive vehicle, said braking system comprising:

a booster diagnosing device for detecting an input and an output of said booster, and determining that said booster is abnormal, if the detected input and output do not meet a predetermined normal relationship therebetween, said booster diagnosing device including (a) a switch for detecting one of said input and output of said booster as a first physical quantity, said switch generating two signals one of which indicates that said first physical quantity is smaller than a predetermined value and the other of which indicates that said first physical quantity is not smaller than said predetermined value, (b) a sensor for substantially continuously detecting the other of said input and output as a second physical quantity when said first physical quantity has become equal to said predetermined value, and (c) determining means for determining that said booster is abnormal, if said second physical quantity detected by said sensor deviates from a normal value thereof corresponding to said predetermined value of said first physical quantity.

2. A braking system according to claim 1, further comprising:

a hydraulic pressure source other than said master cylinder; and a pressure increasing device for performing a pressure increasing operation to increase a hydraulic pressure in said wheel brake cylinder, by using said hydraulic pressure source, such that the hydraulic pressure in said wheel brake cylinder is higher than the hydraulic pressure produced by said master cylinder, said pressure increasing device performing said pressure increasing operation when a predetermined condition is satisfied.

3. A braking system according to claim 2, wherein said pressure increasing device includes a fluid passage connecting said master cylinder and said wheel brake cylinder, a fluid flow control valve provided in said fluid passage, and a pump as said hydraulic pressure source which is connected on a delivery side thereof to a portion of said fluid passage between said fluid flow control valve and said wheel brake cylinder, said pump being activated to deliver a pressurized working fluid to said wheel brake cylinder while a flow of the working fluid from said wheel brake cylinder toward said master cylinder is inhibited by said fluid flow control valve, so that the hydraulic pressure in said wheel brake cylinder is made higher than the hydraulic pressure in said master cylinder.

4. A braking system according to claim 3, wherein said fluid flow control valve includes a solenoid-operated two-position valve having an open position and a closed position.

5. A braking system according to claim 4, wherein said pressure increasing device further includes a pressure difference generator valve which by-passes said two-position valve, said pressure difference generator valve cooperating with said pump to increase the hydraulic pressure in said wheel brake cylinder such that the hydraulic pressure in said wheel brake cylinder is higher than the hydraulic pressure in said master cylinder by a predetermined fixed amount.

6. A braking system according to claim 3, wherein said fluid flow control valve is a pressure control valve including (a) a valve member and a valve seat which are moved away from each other to permit a flow of the working fluid from the wheel brake cylinder toward the master cylinder, and are moved toward each other for fluid tight contact therebetween to inhibit said flow of the working fluid, and (b) a pressure difference control device for producing and controlling a magnetic force acting on one of said valve member and said valve seat in a direction for moving said valve member and said valve seat toward each other, so as to continuously control a difference between the hydraulic pressures in said wheel brake cylinder and said master cylinder, depending upon said magnetic force.

7. A braking system according to claim 6, wherein said pressure difference control device includes a solenoid coil.

8. A braking system according to claim 2, further comprising a master-cylinder-pressure-related sensor for detecting, as said output of said booster, a quantity relating to the hydraulic pressure produced by said master cylinder, and where said pressure increasing device determines, on the basis of said quantity detected by said master-cylinder-pressure-related senor, at least one of a moment at which said pressure increasing operation is initiated and an amount of increase of the hydraulic pressure in said wheel brake cylinder.

9. A braking system according to claim 2, wherein said predetermined condition is satisfied when said booster diagnosing device determines that said booster is abnormal.

10. A braking system according to claim 2, wherein said predetermined condition is satisfied when a boosting limit of said booster has been reached.

11. A braking system according to claim 2, wherein said predetermined condition is satisfied when a determination by said booster diagnosing device that said booster is abnormal is present, or when a boosting limit of said booster has been reached while said determination by said booster diagnosing device is absent, said pressure increasing device determining an amount of increase of the hydraulic pressure in said wheel brake cylinder, to be larger when said determination is present than when said determination is absent.

12. A braking system according to claim 1, wherein said booster includes an input rod which receives said brake operating force, said braking system further comprising:

a connecting member connecting said brake operating member and said input rod;

at least one of (a) a first connector connecting two separate axial portions of said connecting member, so as to permit a relative movement between said two separate axial portions by a predetermined maximum distance in an axial direction of said input rod, (b) a second connector connecting two separate axial portions of said input rod, so as to permit a relative movement between said two separate axial portions of said input rod by a predetermined maximum distance in said axial direction, (c) a third connector connecting said brake operating member and said connecting member as two separate axial portions, so as to permit a relative movement between said brake operating member and said connecting member by a predetermined maximum distance in said axial direction, and (d) a fourth connector connecting said connecting member and said input rod as two separate axial portions, so as to permit a relative movement between said connecting member and said input rod by a predetermined maximum distance in said axial direction; and an elastic member for biasing said two separate axial portions away from each other in said axial direction, said elastic member having a set load corresponding to said predetermined value of said first physical quantity, and wherein said switch includes a brake operating force switch for detecting whether said brake operating force as said first physical quantity is smaller than said predetermined value, said brake operating force switch generating a first output signal indicating that said brake operating force is smaller than said predetermined value, when a distance between said two separate axial portions is the smallest, and a second output signal indicating that said brake operating force is not smaller than said predetermined value, when said distance is the largest.

13. A braking system according to claim 12, wherein said connecting member includes a first engaging portion engaging said brake operating member and a second engaging portion engaging said input rod.

14. A braking system according to claim 13, wherein said first engaging portion engages said brake operating member so as to substantially inhibit said relative movement between said connecting member and said brake operating member in said axial direction, while said second engaging portion engages said input rod so as to permit said relative movement between said connecting member and said input rod in said axial direction, said braking system comprising said fourth connector, said fourth connector including said second engaging portion.

15. A braking system according to claim 13, wherein said first engaging portion engages said brake operating member so as to permit said relative movement between said connecting member and said brake operating member in said axial direction, while said second engaging portion engages said input rod so as to permit said relative movement between said connecting member and said input rod in said axial direction, said braking system comprising said third connector, said third connector including said first engaging portion.

16. A braking system according to claim 13, wherein said first engaging portion engages said brake operating member so as to substantially inhibit said relative movement between said connecting member and said brake operating member in said axial direction, and said second engaging portion engages said input rod so as to substantially inhibit said relative movement between said connecting member and said input rod in said axial direction, said braking system comprising said second connector connecting said two separate axial portions of said input rod.

17. A braking system according to claim 13, wherein said first engaging portion engages said brake operating member so as to substantially inhibit said relative movement between said connecting member and said brake operating member in said axial direction, and said second engaging portion engages said input rod so as to substantially inhibit said relative movement between said connecting member and said input rod in said axial direction, said braking system comprising said first connector connecting said two separate axial portion of said connecting member.

18. A braking system according to claim 1, wherein said booster includes an input rod receiving said brake operating force, said braking system further comprising:
   a connecting member connecting said brake operating member and said input rod, so as to permit a relative movement between said brake operating member and said input rod in an axial direction of said input rod by a predetermined maximum distance;
   a pivotal member connected to said brake operating member such that said pivotal member is pivotable about an axis perpendicular to said axial direction of said input rod, on the basis of said relative movement between said brake operating member and said input rod; and
   an elastic member for biasing said brake operating member and said input rod away from each other in said axial direction, said elastic member having a set load corresponding to said predetermined value of said first physical quantity,
   and wherein said switch includes a brake operating force switch fixed to one of said brake operating member and said pivotal member, such that said brake operating force switch is operated in response to a relative movement between a portion of said one of said brake operating member and said pivotal member at which said brake operating force switch is fixed, and a corresponding portion of said pivotal member, said brake operating force switch generating a first output signal indicating that said brake operating force is smaller than said predetermined value, when a distance between said brake operating member and said input rod is the smallest, and a second output signal indicating that said brake operating force is not smaller than said predetermined value, when said distance is the largest.

19. A braking system according to claim 18, wherein said pivotal member includes a lever which is pivoted as said brake operating member and said input rod are moved relative to each other, such that the relative movement between said brake operating member and said input rod is magnified into the relative movement between said portion of said braking operating member and said corresponding portion of said pivotal member.

20. A braking system according to claim 18, wherein said connecting member includes a first engaging portion engaging said brake operating member and a second engaging portion engaging said input rod, said first engaging portion including a pin which is fixedly disposed on said connecting member and which engages an elongate hole formed through said brake operating member, so as to permit a relative movement between said brake operating member and said connecting member in said axial direction of said input rod by a predetermined maximum distance, said second engaging portion engaging said input rod so as to substantially inhibit a relative movement between said connecting member and said input rod in said axial direction, said pivotal member engaging said brake operating member and said first engaging portion such that said pivotal member is pivotable relative to said brake operating member, about a pivot axis which is spaced from an axis of said input rod in a direction perpendicular to said axial direction, and such that said pivotal member is pivotable relative to said connecting member about an axis of said pin while a relative movement between said pivotal member and said connecting member in said axial direction is substantially inhibited.

21. A braking system according to claim 20, wherein a distance between said pivot axis of said pivotal member and a point of contact of said pivotal member with said brake operating force switch is larger than a distance between said pivot axis and said axis of said pin.

22. A braking system according to claim 20, wherein said pivotal member is attached to said brake operating member so as not to unnecessarily move relative to the brake operating member, even where said pin of said connecting member is not installed so as to connect said pivotal member and said brake operating member.

23. A braking system according to claim 1, wherein said booster includes an input rod which receives said brake operating force, said braking system further comprising:
   a connecting member connecting said brake operating member and said input rod to each other, so as to permit a relative movement between said brake operating member and said input rod in an axial direction of said input rod by a predetermined maximum distance;
   a pivotal member connected to said brake operating member such that said pivotal member is pivotable about an axis perpendicular to said axial direction of said input rod, on the basis of said relative movement between said brake operating member and said input rod; and
   an elastic member for biasing said brake operating member and said input rod away from each other in said axial direction,
   and wherein said booster diagnosing device includes a signal generating device fixed to one of said brake operating member and said pivotal member, such that said signal generating device is operated in response to a relative movement between said brake operating member and said pivotal member caused by said relative movement between said brake operating member and said input rod, said signal generating device generating an output signal relating to said brake operating force as said input of said booster, depending upon a distance of said relative movement between said brake operating member and said input rod.

24. A braking system according to claim 23, wherein said pivotal member includes a lever which is pivoted as said brake operating member and said input rod are moved relative to each other, such that the relative movement between said brake operating member and said input rod is magnified into the relative movement between a portion of said one of said brake operating member and said pivotal member at which said signal generating device is fixed, and a corresponding portion of the other of said brake operating member and said pivotal member.

25. A braking system according to claim 1, wherein said first physical quantity is said input while said second physical quantity is said output.

26. A braking system according to claim 1, wherein said switch includes a switch for detecting a predetermined value of said brake operating member.

27. A braking system according to claim 1, wherein said sensor includes a sensor for detecting said hydraulic pressure produced by said master cylinder.

28. A braking system for an automotive vehicle, comprising:
   a brake operating member; a booster for boosting a brake operating force acting on said brake operating member, said booster including an input rod which receives said brake operating force;
   a master cylinder for producing a hydraulic pressure on said basis of an input force received from said booster as a result of boosting of said brake operating force by said booster;
   a wheel brake cylinder which is activated by said hydraulic pressure produced by said master cylinder, to brake a wheel of said automotive vehicle;
   a connecting mechanism connecting said brake operating member and said input rod to each other, so as to permit a relative movement between said brake operating member and said input rod in an axial direction of said input rod by a predetermined maximum distance;
   a signal generating device generating an output signal relating to said brake operating force depending upon a distance of said relative movement between said brake operating member and said input rod;
   a pivotal member connected to said brake operating member such that said pivotal member is pivotable about an axis perpendicular to said axial direction of said input rod, on the basis of said relative movement between said brake operating member and said input rod; and
   an elastic member for biasing said brake operating member and said input rod away from each other in said axial direction,
   and wherein said signal generating device is fixed to one of said brake operating member and said pivotal member, such that said signal generating device is operated in response to a relative movement between said operating member and said pivotal member caused by said relative movement between said brake operating member and said input rod.

29. A braking system according to claim 28, wherein said signal generating device is a switch for detecting for detecting one of an input of said booster as a first physical quantity, said switch generating two signals one of which indicates that said first physical quantity is smaller than a predetermined value and the other of which indicates that said first physical quantity is not smaller than said predetermined value, said braking system further comprising:
   a sensor for substantially continuously detecting an output of said booster as a second physical quantity when said first physical quantity has become equal to said predetermined value; and
   determining means for determining that said booster is abnormal, if said second physical quantity detected by said sensor deviates from a normal value thereof corresponding to said predetermined value of said first physical quantity.

30. A braking system according to claim 29, wherein said switch is positioned relative to said one of said brake operating member and said pivotal member such that said switch generates said other of said two signals when said pivotal member is pivoted away from said switch.

31. A braking system according to claim 29, wherein said switch is positioned relative to said one of said brake operating member and said pivotal member such that said switch generates said other of said two signals when said pivotal member is pivoted toward said switch.

32. A braking system according to claim 28, wherein said pivotal member includes a lever which is pivoted as said brake operating member and said input rod are moved relative to each other, such that the relative movement between said brake operating member and said input rod is magnified into the relative movement between a portion of said one of said brake operating member and said pivotal member at which said signal generating device is fixed, and a corresponding portion of the other of said brake operating member and said pivotal member.

33. A method of diagnosing a booster of a braking system for an automotive vehicle, said braking system including a brake operating member operated with a brake operating force, a master cylinder for producing a hydraulic pressure on the basis of an input force received from said booster as a result of boosting of said brake operating force by said booster, and a wheel brake cylinder which is activated by the hydraulic pressure produced by said master cylinder, to brake a wheel of the automotive vehicle, said method comprising the steps of;
   detecting an input and an output of said booster; and
   determining that said booster is abnormal if the detected input and output do not meet a predetermined normal relationship therebetween,
   and wherein one of said input and output of said booster is detected as a first physical quantity by a switch which generates two signals one of which indicates that said first physical quantity is smaller than a predetermined value and the other of which indicates that said first physical quantity is not smaller than said predetermined value, the other of said input and output being substantially continuously detected as a second physical quantity by a sensor when said first physical quantity has become equal to said predetermined value, and wherein said booster is determined to be abnormal, if the second physical quantity detected by said sensor deviates from a normal value thereof corresponding to said predetermined value of said first physical quantity.

34. A method according to claim 33, wherein said input and said output of said booster are substantially concurrently detected by respective sensors, and said booster is determined abnormal if the detected input and output do not meet said predetermined normal relationship.

35. A method according to claim 33, wherein said first physical quantity is said input while said second physical quantity is said output.

36. A method of diagnosing a booster of a braking system for an automotive vehicle, said braking system including a broke operating member operated with a brake operating force, a master cylinder for producing a hydraulic pressure on the basis of an input force received from said booster as a result of boosting of said brake operating force by said booster, and a wheel brake cylinder which is activated by the hydraulic pressure produced by said master cylinder, to brake a wheel of the automotive vehicle, said method comprising the steps of;

detecting an input and an output of said booster; and determining that said booster is abnormal, if the detected input and output do not meet a predetermined normal relationship therebetween, and wherein one of said input and output of said booster is detected as a first physical quantity by first detecting means, and the other of said input and output is detected as a second physical quantity by second detecting means, and wherein said booster is determined to be abnormal, if the second physical quantity detected by said second detecting means when said first physical quantity has become equal to a predetermined value deviates from a normal value thereof corresponding to said predetermined value of said first physical quantity, by more than a predetermined amount.

37. A braking system of an automotive vehicle including a brake operating member, a booster for boosting a brake operating force acting on said brake operating member, a master cylinder for producing a hydraulic pressure on the basis of an input force received from said booster as a result of boosting of said brake operating force by said booster, and a wheel broke cylinder which is activated by the hydraulic pressure produced by said master cylinder, to brake a wheel of the automotive vehicle, said braking system comprising;

a booster diagnosing device for detecting an input and an output of said booster, and determining that said booster is abnormal, if the detected input and output do not meet a predetermined normal relationship therebetween, said booster diagnosing device including (a) first detecting means for detecting one of said input and output of said booster as a first physical quantity, (b) second detecting means for detecting the other of said input and output as a second physical quantity, and (c) determining means for determining that said booster is abnormal, if said second physical quantity detected by said sensor when said first physical quantity has become equal to a predetermined value deviates from a normal value thereof corresponding to said predetermined value of said first physical quantity, by more than a predetermined amount.

\* \* \* \* \*